(12) United States Patent
Wakasugi

(10) Patent No.: US 6,198,496 B1
(45) Date of Patent: Mar. 6, 2001

(54) PRINTER

(75) Inventor: Nobuo Wakasugi, Tokyo (JP)

(73) Assignee: Oki Data Corporation (JP)

( * ) Notice: Subject to any disclaimer, the term of this patent is extended or adjusted under 35 U.S.C. 154(b) by 0 days.

(21) Appl. No.: 09/116,117

(22) Filed: Jul. 15, 1998

(30) Foreign Application Priority Data

Jul. 23, 1997 (JP) .................................................. 9-212605

(51) Int. Cl.[7] .............................. B41J 2/435; B41J 2/47
(52) U.S. Cl. ........................................ 347/237; 347/117
(58) Field of Search ...................................... 347/117, 118, 347/130, 132, 232, 237, 129

(56) References Cited

U.S. PATENT DOCUMENTS

| | | | |
|---|---|---|---|
| 4,455,578 | * | 6/1984 | Fearnside . |
| 5,179,392 | * | 1/1993 | Kawaguchi ............................ 347/118 |
| 5,339,150 | * | 8/1994 | Hubble, III et al. ............. 347/118 X |
| 5,751,327 | * | 5/1998 | De Cock et al. ..................... 347/130 |
| 5,754,218 | * | 5/1998 | Baek et al. ........................ 347/237 X |
| 5,809,216 | * | 9/1998 | Ng ..................................... 347/232 X |

* cited by examiner

*Primary Examiner*—Sandra Brase
(74) *Attorney, Agent, or Firm*—Akin, Gump, Strauss, Hauer & Feld, L.L.P.

(57) ABSTRACT

A printer includes LED heads and head controllers. Each head controller transfers items of data to a corresponding head over a set of common buses. The LED head has a receiver activated by a corresponding head selecting signal. In one configuration, the common buses may include a selector bus over a data bus. Image data and a group of signals are alternately transferred over the data bus, the group of signals including a latch signal for latching the image data into a corresponding head and a strobe signal for driving a corresponding head in accordance with the image data. The selector signal allows the receiver to direct the image data and the group of signals into separate data paths. In another configuration, the control signals may further include an image clock and a control clock. The common buses may include an image clock bus, a control clock bus, and a data bus over which the image data and the group of signals are alternately transferred, the image data being attended by the image clock and the group of signals being attended by the control clock. In still another configuration, the image data may include a train of image data in which first image data and second image data appear alternately. One receiver receives the first image data on the rising edges of the image clock and another receiver receives the second image data on the falling edges.

16 Claims, 35 Drawing Sheets

FIG.11B

DELAY INFORMATION TABLE

| ADDRESS | TIME DATA |
|---|---|
| 0 | T0 |
| 1 | T1 |
| 2 | T2 |
| 3 | T3 |
| 4 | T4 |
| 5 | T5 |
| 6 | T6 |

FIG.11A

CONTROL INFORMATION TABLE

| ADDRESS | CONTROL DATA |
|---|---|
| 0 | 00001 |
| 1 | 00010 |
| 2 | 00100 |
| 3 | 01000 |
| 4 | 00000 |
| 5 | 10000 |
| 6 | 00000 |

FIG.19A

CONTROL INFORMATION TABLE

| ADDRESS | CONTROL CODE |
|---|---|
| 0 | STROBE0 |
| 1 | STROBE1 |
| 2 | STROBE2 |
| 3 | STROBE3 |
| 4 | RESET |
| 5 | LATCH |
| 6 | RESET |

FIG.19B

DELAY INFORMATION TABLE

| ADDRESS | TIME DATA |
|---|---|
| 0 | T0 |
| 1 | T1 |
| 2 | T2 |
| 3 | T3 |
| 4 | T4 |
| 5 | T5 |
| 6 | T6 |

FIG.20

| 5-BIT PATTERN | | | | | 4-BIT PATTERN | |
|---|---|---|---|---|---|---|
| LATCH | STROBE 3 | STROBE 2 | STROBE 1 | STROBE 0 | CONTROL CODE | VALUE |
| 0 | 0 | 0 | 0 | 0 | RESET | 0000 |
| 0 | 0 | 0 | 0 | 1 | STROBE0 | 0001 |
| 0 | 0 | 0 | 1 | 0 | STROBE1 | 0010 |
| 0 | 0 | 1 | 0 | 0 | STROBE2 | 0011 |
| 0 | 1 | 0 | 0 | 0 | STROBE3 | 0100 |
| 1 | 0 | 0 | 0 | 0 | LATCH | 0101 |

PRINTER

BACKGROUND OF THE INVENTION

1. Field of the Invention

The present invention relates to printers and facsimile machines, and more particularly to a printer where multiplexed print data is transferred from control circuits to corresponding one of a plurality of print heads via a common bus line.

2. Description of Related Art

An electrophotographic color printer incorporates a series of print engines of the same construction. Each print engine operates for a corresponding one of yellow, magenta, cyan, and black images. Such a system is referred to as tandem system. An LED array illuminates a photoconductive drum to form an electrostatic latent image of a corresponding color on the surface of the drum. The electrostatic latent image is then developed with a corresponding colored toner into a colored toner image. The colored toner image is then transferred to a print medium. As the print medium passes through the series of print engines, yellow, magenta, cyan, and black toner images are transferred one over the other on the print medium, thereby producing a full color image.

However, a tandem system requires a large number of interface cables which increase manufacturing cost. For example, a control circuit generates image data for each color and transfers the image data to a corresponding LED print head. Therefore, in order to communicate image data and associated control signals, a total of four sets of cables are connected between the respective LED print heads and the circuit board on which the control circuits are built.

A large number of cables necessarily increases the number of connectors and the number of pins of LSIs that connect cables, and therefore requires large circuit boards. This increases the total cost of the printer. In addition, a large number of wires radiate more noise, and therefore requires some measure for addressing increased noise radiation.

The aforementioned problems exist not only in a printer having a plurality of LED heads but in thermal transfer type printers, ink jet type printers and the like having a plurality of print heads.

SUMMARY OF THE INVENTION

An object of the invention is to provide a printer which minimizes the number of cables required for transferring image data and associated control signals such as clock, strobe, and latch.

A printer of the invention includes a plurality of LED heads or the like and a plurality of head controllers. Each head controller transfers a plurality of items of data, including image data and control signals associated with the image data, to a corresponding one of the plurality of heads over a set of common buses. Each LED head has a receiver that is activated by a corresponding head selecting signal and receives the plurality of items of data.

In the first embodiment, the image data DD is transferred over the data bus and the control signals (clock DK, strobe DS, and latch DL) are transferred over corresponding lines of the set of common buses.

In the second embodiment, the set of common buses include a selector bus over which the selector signal DC is transferred and a data bus over which the image data DD and the a group of signals (strobe DS and latch DL) are alternately transferred. The group of signals includes a latch signal DL for latching the image data DD into a corresponding head strobe signals DS for driving a corresponding head in accordance with the image data DD. The selector signal DC indicates which of the image data DD and the group of signals is transferred over the data bus.

In the third embodiment, encoding the control signals reduces the number of bus lines of the set of common buses. In the fourth embodiment, the control signals include a group of signals (strobe DS and latch DL), an image clock, and a control clock. The set of common buses include an image clock bus over which the image clock GK is transferred, a control clock bus over which the control clock SK is transferred, and a data bus over which the image data DD and the group of signals are alternately transferred. The group of signals is attended by the control clock SK and the image data is attended by the image clock GK.

In the fifth embodiment, the image data DD includes a train of image data in which first image data and second image data appear alternately. One of two receivers receives the first image data on the rising edges of the image clock GK and the other receivers receives the second image data on the falling edges of the image clock GK.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 11A and 11B illustrate the contents of the control information table and time information table, respectively;

FIG. 19A illustrates a control information table;

FIG. 19B shows a time information table;

FIG. 20 illustrates the coding assignment of the output pattern of the output port of the control information table when the control data is coded into 4-bit control codes;

DETAILED DESCRIPTION OF THE INVENTION

The present invention will be described in detail by way of preferred embodiments with reference to the accompanying drawings.

First Embodiment

Figure 1:
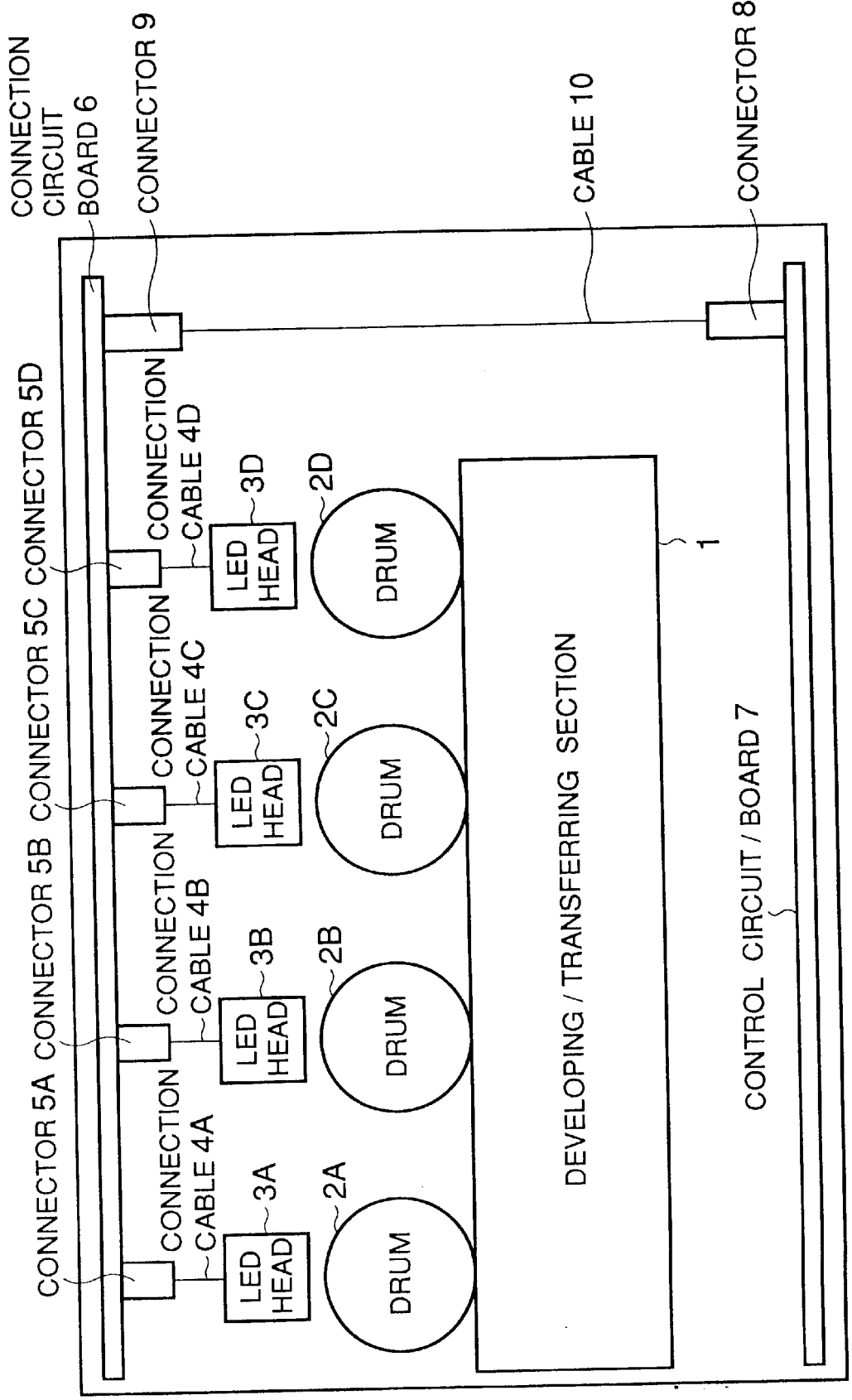
FIG. 1 is a cross-sectional view of the printer.
Figure 2:
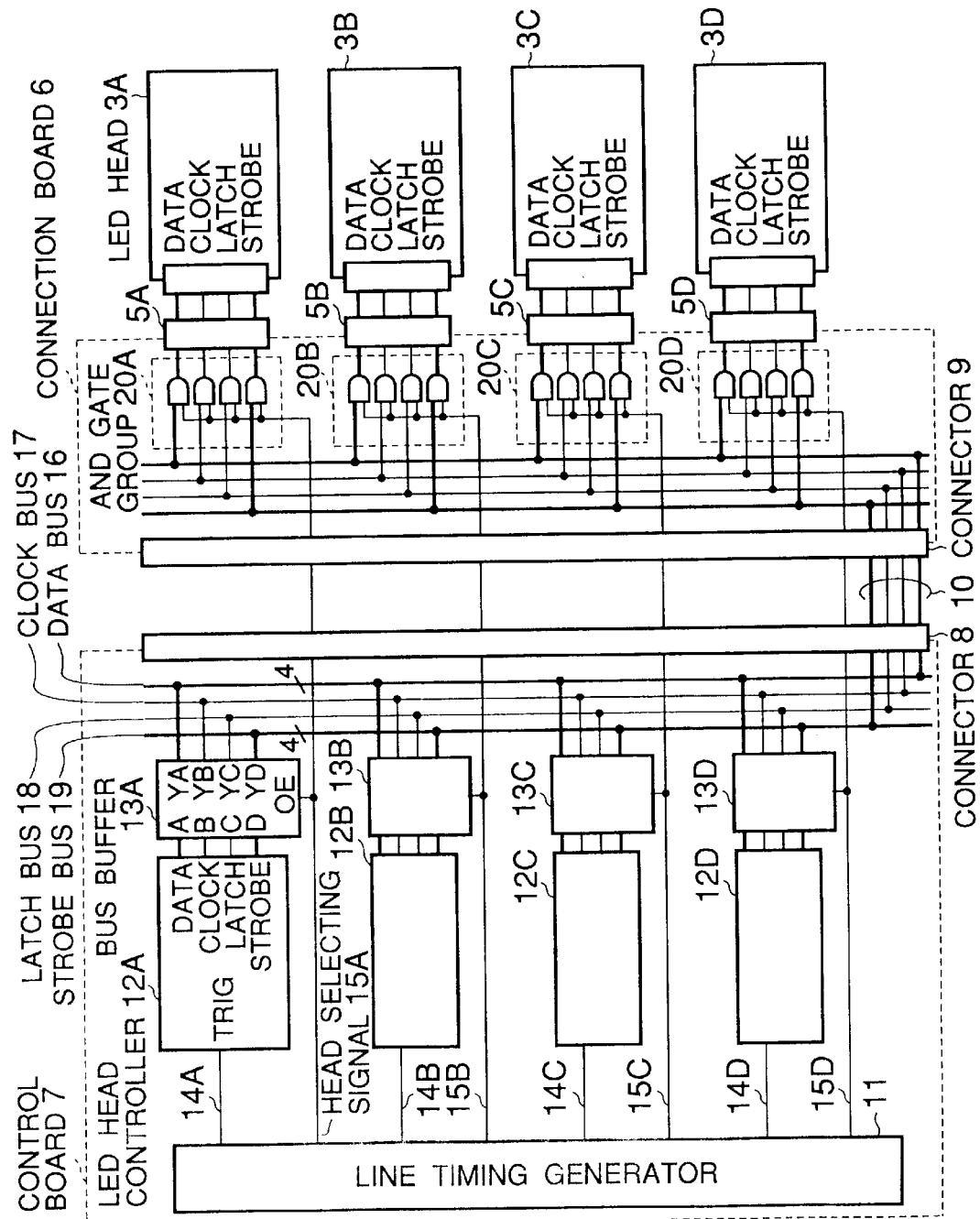
FIG. 2 is a block diagram showing a printer according to a first embodiment.

FIG. 1 is a cross-sectional view of the printer. FIG. 2 is a block diagram showing a printer according to a first embodiment.

The printer shown in FIG. 1 is assumed to be a tandem system type electrophotographic printer. A total of four photoconductive drums 2A, 2B, 2C, and 2D are provided at a developing/transferring section 1 where images are formed, developed, and transferred to a print medium as the print medium is transported.

There are provided four LED heads 3A, 3B, 3C, and 3D which illuminate the corresponding photoconductive drums 2A, 2B, 2C, and 2D to form electrostatic latent images for corresponding color, respectively. The four LED heads 3A, 3B, 3C, and 3D are connected to a connection circuit board 6 via connection cables 4A, 4B, 4C, and 4D and connectors 5A, 5B, 5C, and 5D, respectively. The connection circuit board 6 is connected to a control circuit board 7 via connectors 8 and 9 and cable 10. The data is transferred from the control circuit board 7 to the connection circuit board 6 via the connector 8, cable 10, and connector 9. Then, the connection circuit board 6 supplies the data for the respective colors to the corresponding LED heads 3A, 3B, 3C, and 3D.

An object of the present invention is to reduce the number of lines in the cable 10 over which the data and associated signals are transferred from the control circuit board 7 to the connection circuit board 6.

Referring to FIG. 2, the control circuit board 7 has a line timing generator 11, LED head controllers 12A, 12B, 12C, and 12D, and bus buffers 13A, 13B, 13C, and 13D. The LED head controllers 12A–12D generate data for corresponding ones of color, yellow, magenta, cyan, and black images, respectively. The bus buffers 13A–13D temporarily store the outputs of these LED head controllers and outputs them.

The line timing generator 11 includes counters and gate circuits, and generates timings at which the respective LED controllers 12A, 12B, 12C, and 12D output corresponding data, and supply trigger signals 14A, 14B, 14C, and 14D to the corresponding LED heads controllers 12A, 12B, 12C, and 12D, respectively. The line timing generator 11 also outputs head selecting signals 15A, 15B, 15C, and 15D to select corresponding LED heads.

Each of the bus buffers 13A–13D is connected to a data bus 16, a clock bus 17, a latch bus 18, and a strobe bus 19. The data bus 16 and strobe bus 19 are, for example, a 4-bit bus, i.e., each bus requiring four lines. Other buses are a one-line bus.

The bus buffer 13A receives the head selecting signal 15A at its OE (output enable) terminal. The bus buffer 13A receives the data and clock signal from the LED controller 12A and outputs the received data and clock signal to the bus 16 and bus 17, respectively, when the head selecting signal 15A is active. When the head selecting signal 15A is not active, the output of the bus buffer 13A becomes a high impedance. The other bus buffers 13B–13D operate the same way as the bus buffer 13A. The bus buffers 13A–13D are connected one at a time to the data bus 16, clock bus 17, latch bus 18, and strobe bus 19, so that data from a corresponding one of the LED controllers 12A–12D is transferred to the connection circuit board 6 via the corresponding bus buffer.

The connection circuit board 6 includes AND gate groups 20A, 20B, 20C, and 20D and connectors 5A, 5B, 5C, and 5D, for LED heads 3A, 3B, 3C, and 3D, respectively. Each AND gate group includes two-input AND gates one inputs of which are connected to the data bus 16, clock bus 17, latch bus 18, and strobe bus 19, respectively, and the other inputs of which are connected together and receive the head selecting signal. The gates are opened and closed by the head selecting signal which is output from the line timing generator 11 built on the control circuit board 7.

Figure 3:
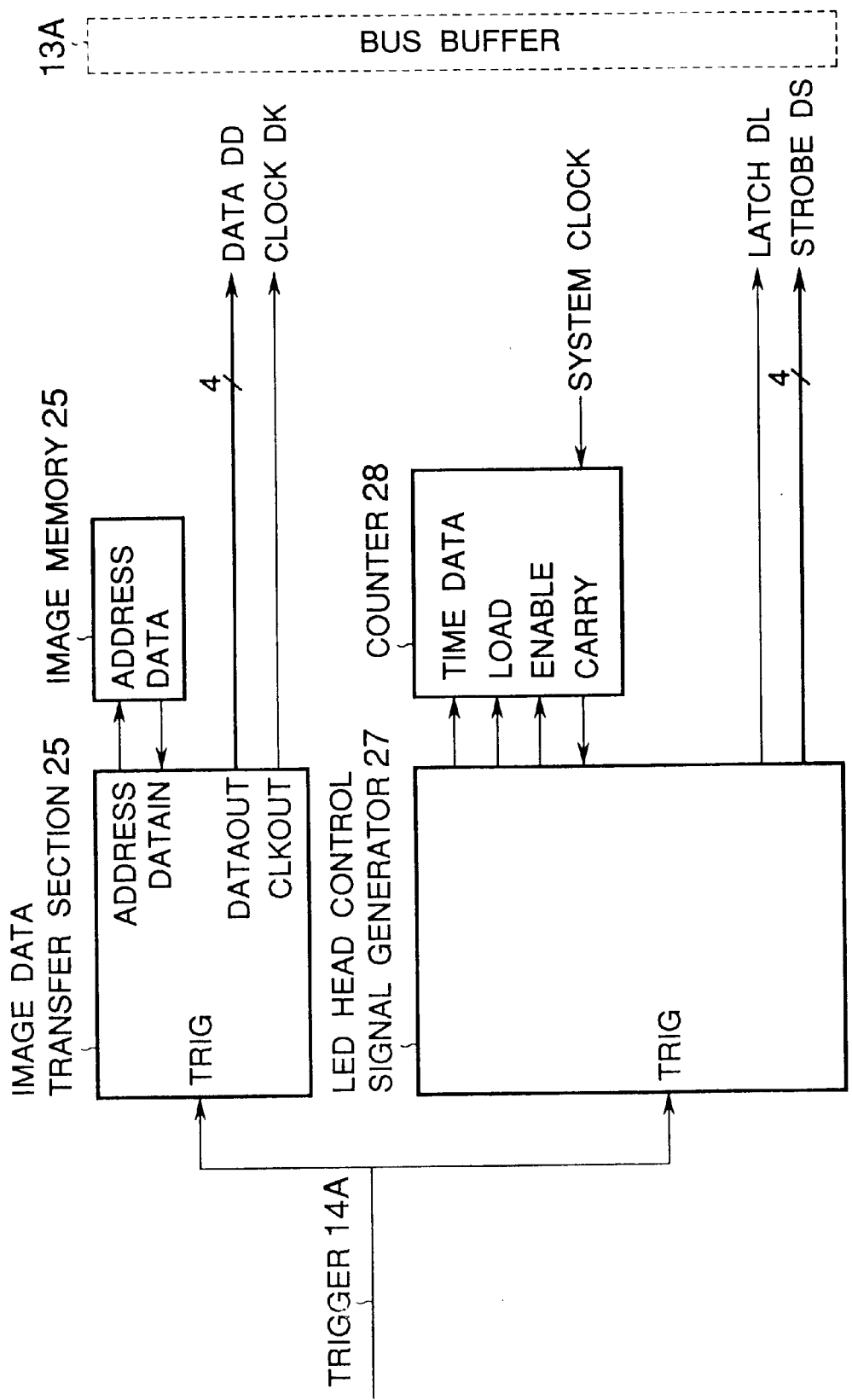
FIG. 3 is a block diagram of the LED head controller.

FIG. 3 is a block diagram of the LED head controllers 12A. The LED controller 12A has an image data transfer section 25 and LED head control signal generator section 27. The sections 25 and 27 receive the trigger signal 14A. The image data transfer section 25 is connected to an image memory 26 and outputs a necessary address signal to the image memory 26 to read image data for a corresponding color from the image memory 26.

The image data transfer section 25 is triggered by the trigger signal 14A to output data DD and clock DK. The LED head control signal generator 27 is connected to a counter 28 and outputs signals such as latch DL and strobe DS in timed relation with the CARRY or count of the counter 28.

The data DD is a 4-bit multivalue signal, the four bits representing one pixel. The clock DK is a control clock on which the data DD is transferred on a bit-by-bit basis. The latch DL is a timing signal at which the LED head holds data for one line when the data is transferred to the LED head. The strobe DS is a timing signal that causes the LEDs to emit light in accordance with the image data held therein at the timing of the latch DS. The LED head includes a plurality of LEDs which are divided into four groups. The four groups are energized in turn one group at a time. This way of driving LEDs can save drive current since all the groups are not energized simultaneously. The aforementioned data DD and timing signals DK, DL, and DS are output to the bus buffer 13A shown in FIG. 1. The other LED head controllers 12B, 12C, and 12D are of the same construction as the LED head 12A.

Figure 4:
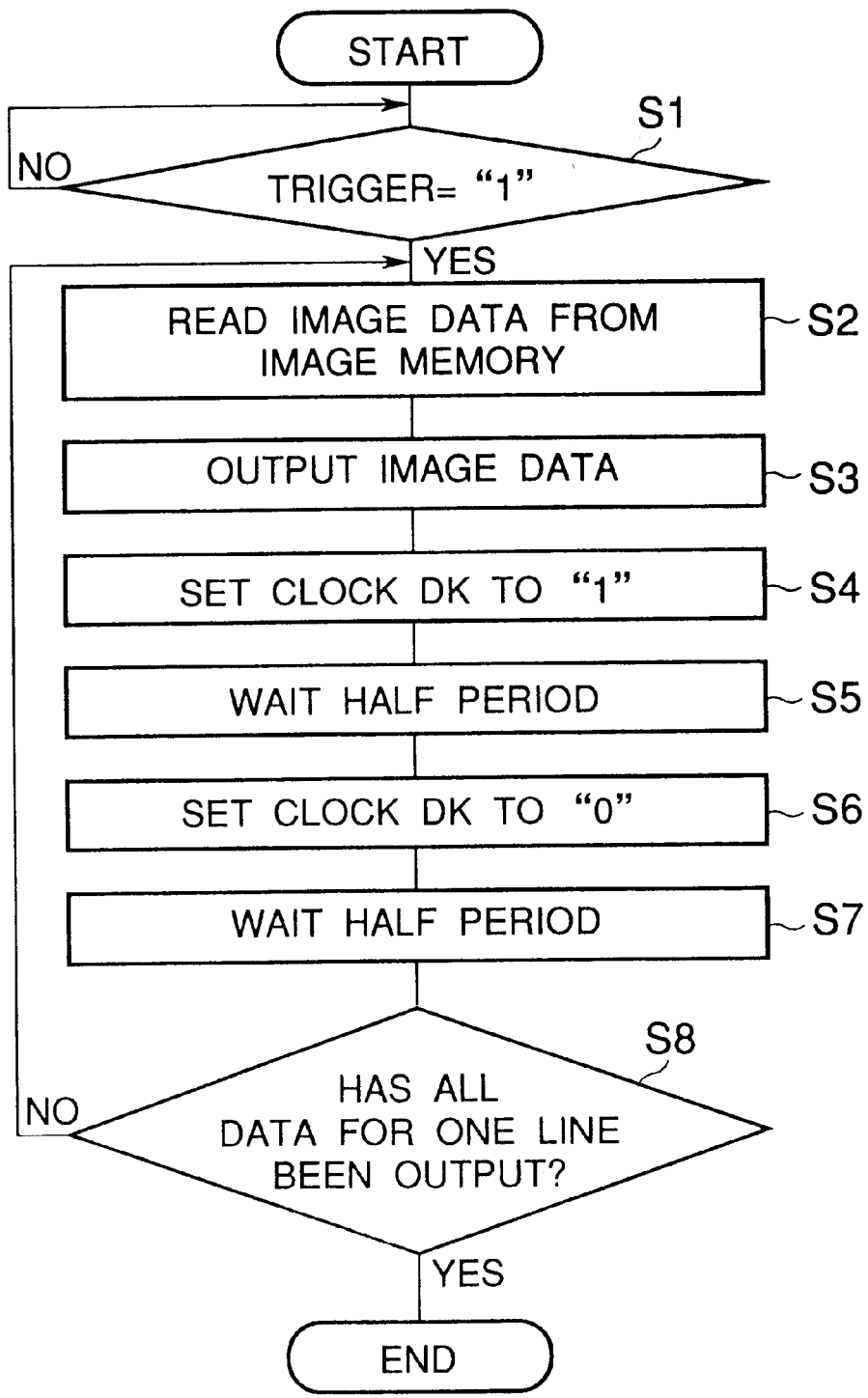
FIG. 4 is a flowchart showing the operation of the LED head controller.

FIG. 4 is a flowchart showing the operation of the LED head controller. At step S1, a check is made to determine whether the trigger is "1." When the trigger is "1," the program proceeds to step S2 where the image data transfer section 25 reads data for one value of a pixel of the multivalue data of a pixel from the image memory 26 shown in FIG. 3. At step S3, the image data transfer section 25 outputs the image data. At step S4, the clock DK is set to "1." Then, at step S5, the clock DK remains "1" for a half period and subsequently is set to "0" at step S6. At step S7, the clock DK remains "0" for another half period. Thus, one value of the multivalue data is output on one clock DK. Then, the program proceeds to step S8 where a check is made to determine whether data for one line has been output. If the answer is NO, then the program jumps back to step S2.

Figure 5:
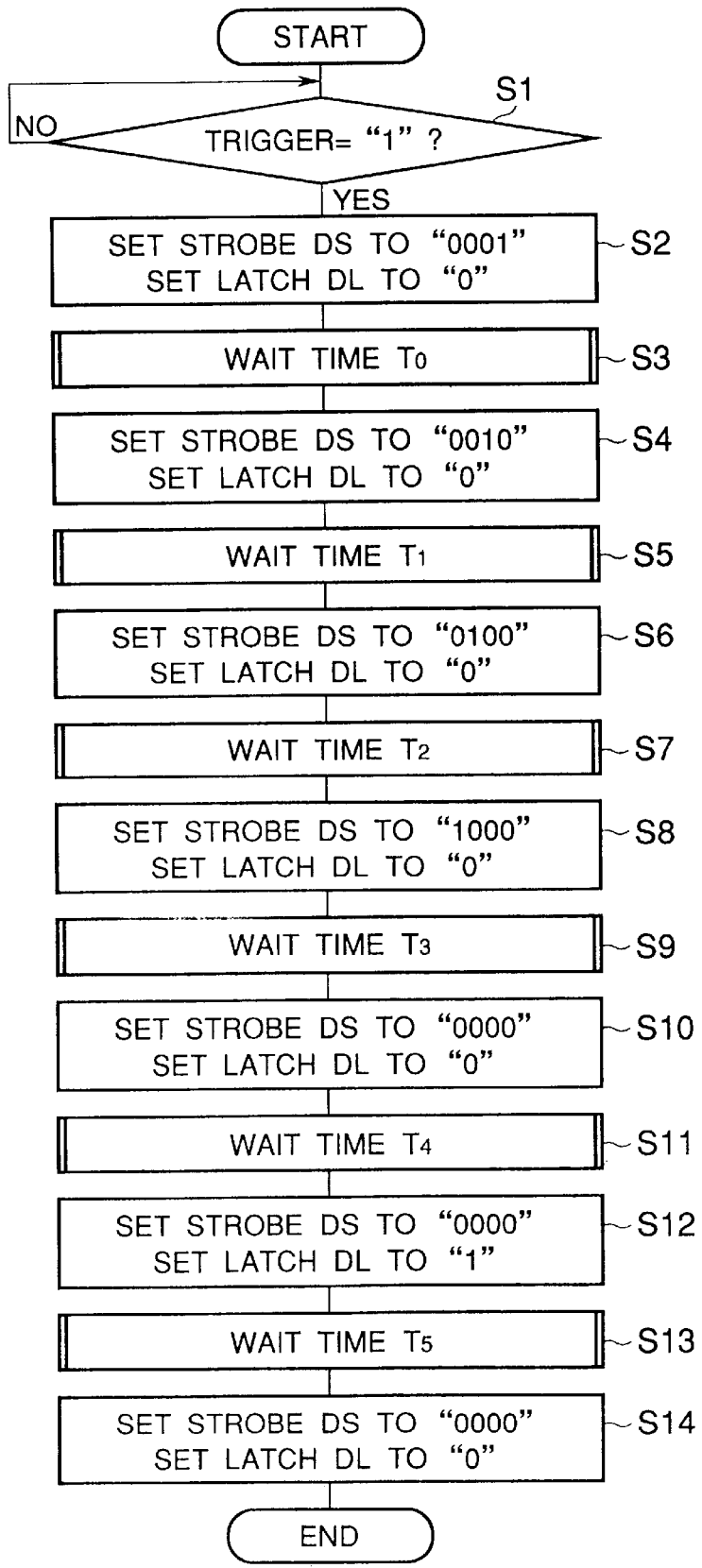
FIG. 5 is a flowchart illustrating how the LED head controller generates the control signals.

FIG. 5 is a flowchart illustrating how the LED head controller generates the control signals. At step S1, a check is made to determine whether the trigger is "1". When the trigger is "1," the program proceeds to step S2 where the strobe DS is set to "0001" and the latch DL is set to "0." At step S3, the program waits a time t0 and at step S4 the strobe DS is set to "0010" and the latch DL is set to "0." Thereafter, the program waits a time t1 and at step S6 the strobe DS is set to "0100" and the latch DL is set to "0." At step S7, the program waits a time t2 and at step S8 the content of the strobe DS is set to "1000" and the latch DL is set to "0."

At step S9, the program waits a time t3, and at step S10 the strobe DS is set to "0000" and the latch is set to "0. At step S11, the program waits a time t4 and at step S12 the strobe DS is set to "0000" and the latch DL is set to "1." Finally, at step S13 the program waits a time t5 and at step S14, the strobe DS is set to "0000" and the latch DL is set to "0."

In this manner, the content of the strobe DS is changed in the order of "0001," "0010," "0100," and "1000," thereby driving the four groups of LEDs in the LED head in order. Upon completion of the transfer of data for four groups of LEDs, the latch DL is set to "1," thereby latching the data for one line. The aforementioned steps are repeated so as to transfer data for four groups of LEDs, latch the data for all four groups, and energize the four groups of LEDs one group at a time. The steps S1–S14 are repeated for every line.

Figure 6:
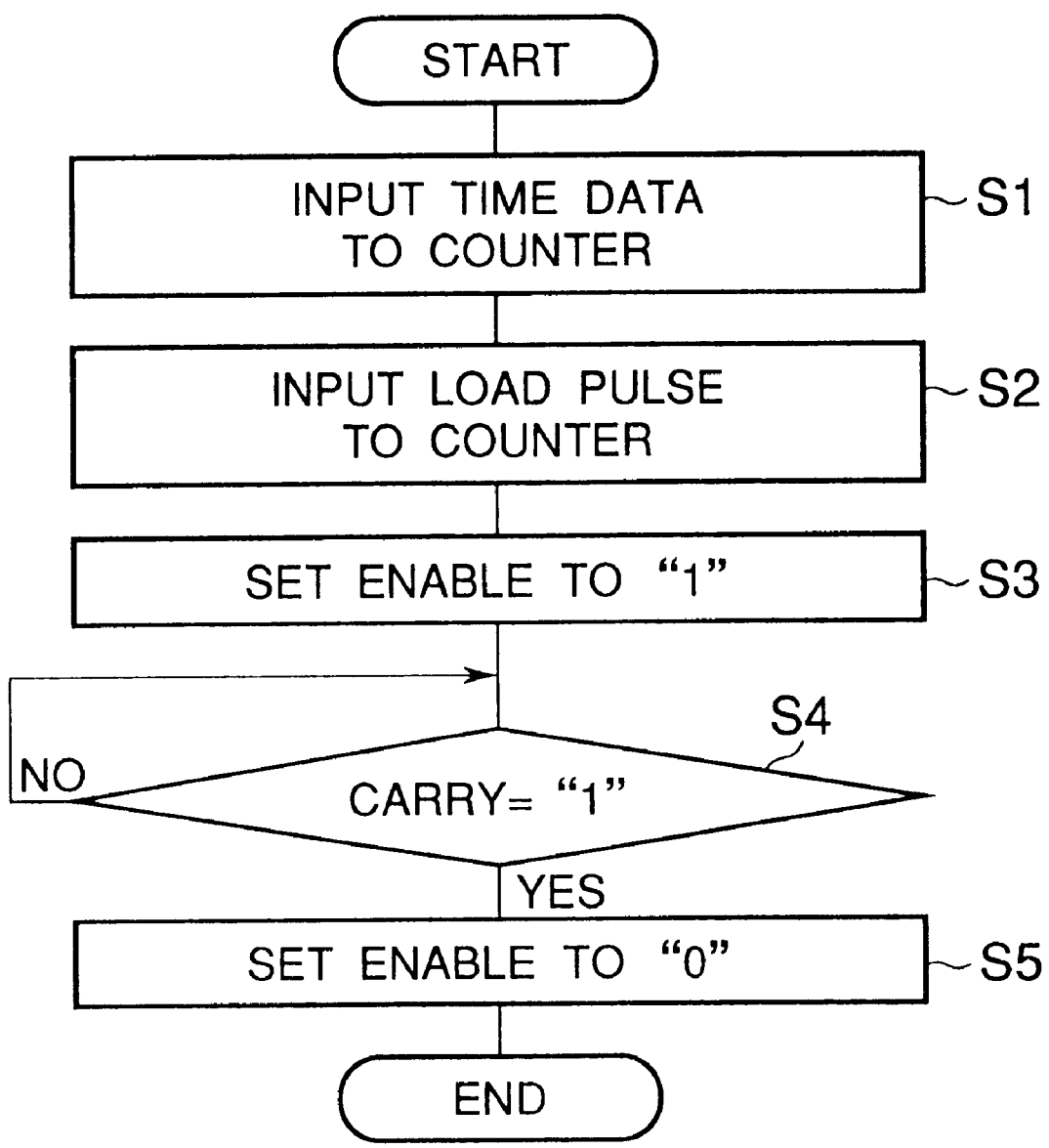
FIG. 6 is a flowchart illustrating the operation of generating the times t0–T5.

FIG. 6 is a flowchart illustrating the operation of generating the times t0–t5.

The aforementioned times t0–t5 have been predetermined taking the operation timings of the apparatus into consideration. The times t0–t5 are generated by the counter 28 as follows: At step S1, time data T0 for time t0 is output to the counter 28 and at step S2 the time data T0 is loaded upon a LOAD pulse. At step S3, an ENABLE signal of "1" is output to the counter 28. Then, the counter 28 begins to count down on the system clock, not shown, and a check is made at step S4 to determine whether CARRY is "1."If the answer is YES at step S4, then an ENABLE signal of "0" is output to the counter 28. In this manner, every time the counter 28 is loaded with one of the items of the time data T0, T1, T2, T3, T4, and T5 for times t0, t1, t2, t3, t4, and t5, the counter 28 counts down till the CARRY becomes "1," thereby sequentially generating the respective time data for times t0–t5.

Next, a specific operation of the printer according to the invention will be described.

Figure 7:
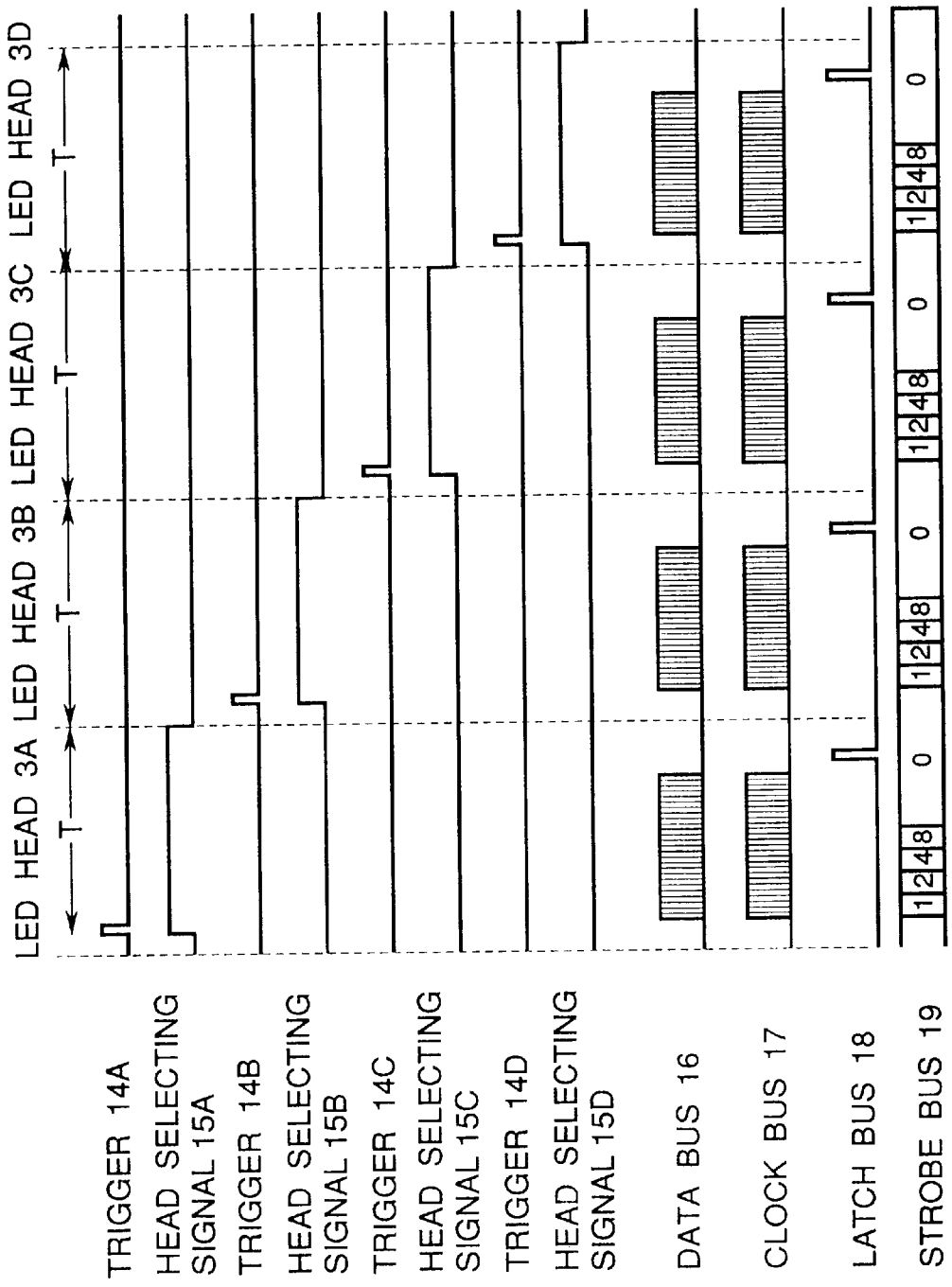
FIG. 7 is a timing chart of signals on the buses according to the first embodiment.

FIG. 7 is a timing chart of signals appearing on the buses according to the first embodiment.

The triggers 14A–14D are input to corresponding LED head control circuits 12A–12D at a predetermined timing. Each of the head selecting signals 15A–15D opens a corresponding one of four groups of AND gates 20A–20D, one group at a time for the period T.

By way of example, the timings will be described with respect to the LED head 3A. The head selecting signal 15A is output to the head controller 12A for a time period T and the head controller 12A outputs the data DD for the present one line. The data DD is transferred over the data bus 16, and the clock DK for transferring the data is sent over the clock bus 17. The strobe DS is also transferred over the strobe bus 19. It is to be noted that this strobe DS is used to drive the LEDs in the LED head 3A in accordance with the image data DD which was previously latched. The strobe DS "0001," "0010," "0100," and "1000" are shown in decimal expressions "1", "2", "4", or "8" in FIG. 7 for convenience. The values "1", "2", "4", and "8" are transferred in order, each value driving a corresponding one of the four groups of the LEDs so that the four groups are driven one at a time. After the data DD for the present one line has been transferred, the latch signal DL is transferred over the latch bus 18. The latched data will be used to drive the four groups of the LEDs of the LED head 3A for a time period T during which data for the following one line is transferred to the LED head 3A.

In this manner, the data DD is transferred to the respective LED heads over the cable 10 shown in FIG. 1 in time division form.

Figure 8:
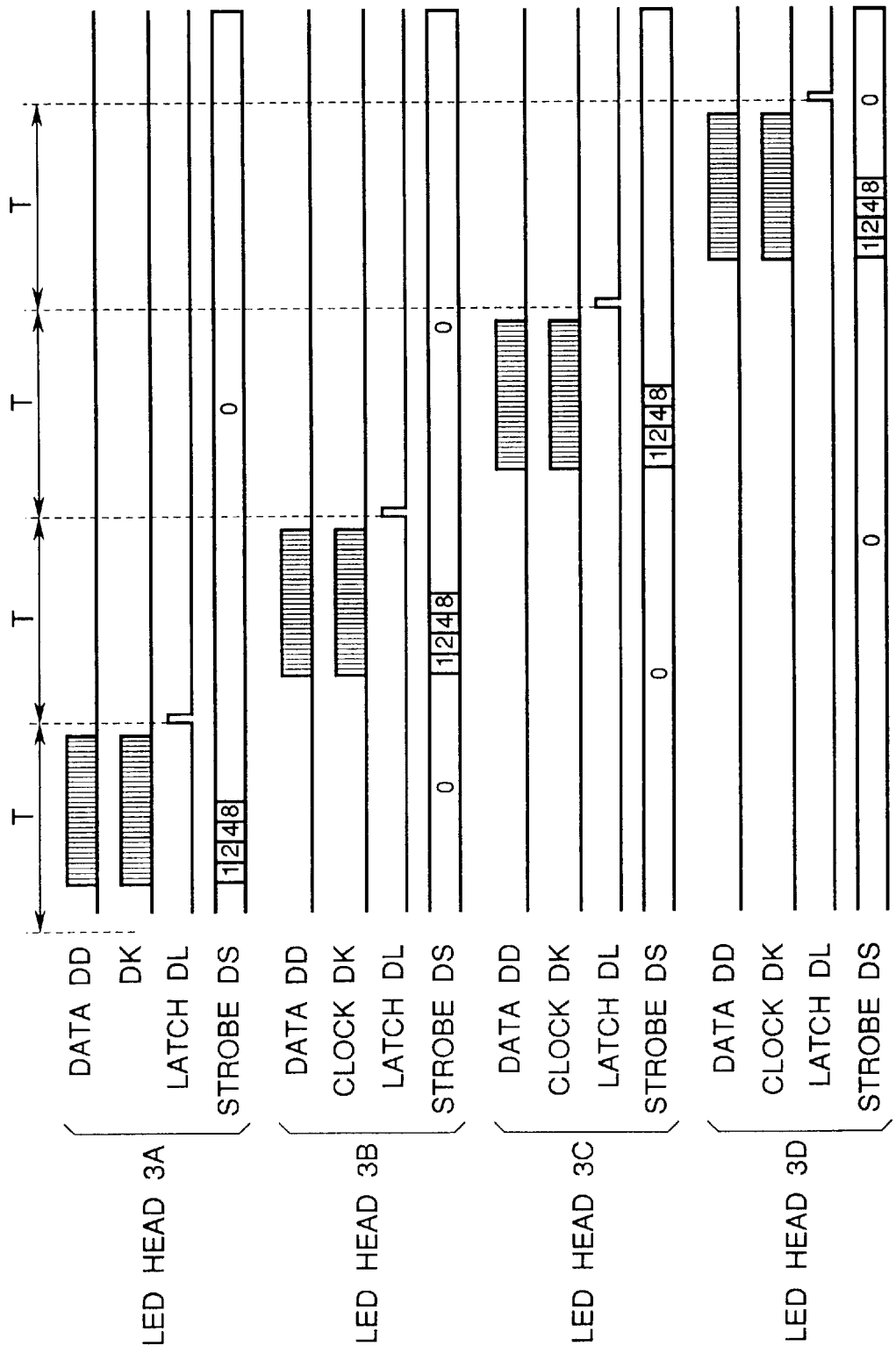
FIG. 8 is a timing chart illustrating signals supplied to the respective LED heads.

FIG. 8 is a timing chart illustrating signals supplied to the respective LED heads 3A–3D.

The respective LED heads 3A–3D receive corresponding data DD, clock DK, latch DL, and strobe DS. The data DD and control signals (DK, DL, and DS) are the same as those in the conventional apparatus. That is, the circuit in FIG. 1 operates in such a way that the control circuit board 7 communicates with the connection board 6 to transfer data DD and control signals (DK, DL, and DS) to the respective heads, thereby driving the respective heads. It is to be noted that as described with reference to FIG. 7, the strobe DS is to drive the LEDs in the respective LED head with the data DD for one line which has been latched at the end of the previous period T during which the data for the previous one line was transferred to the LED head.

Advantages of the First Embodiment

A plurality of items of data for corresponding LED heads are time-division multiplexed and transferred over one set of cable assembly for a single LED head. In other words, the cable assembly serves as a set of common buses to transfer the image data DD and control signals DK, DL, and DS to the respective LED heads. This way of transmitting signals greatly reduces the number of sets of cable assembly that run between the control circuit board and the connection board. The circuit shown in FIG. 1 requires only a set of 10 lines for transferring data DD and control signals DK, DL, and DS from the control circuit board 7 to the connection board 6. The 10 lines include 4 lines for the data bus 16, 1 line for the clock bus 17, 1 line for the latch bus 18, and 4 lines for the strobe bus 19. Additional 4 lines are required for each LED head in order to transfer the head selecting signals 15A–15D to the connection board 6. Thus, a total 26 (=10+4×4) lines are required for the control circuit board 7 to communicate the image data DD and control signals DK, DL, and DS with the connection board 6. This implies that the total number of lines can be reduced to almost two-thirds of that (10×4=40 lines) of the conventional art.

Therefore, the construction of the first embodiment eliminates the need for a large number of complicated connectors and high density multi-layer circuit boards made of glass epoxy. The construction reduces the total area of the circuit board and the number of connectors, reducing the manufacturing cost. The decrease in the number of cables contributes not only to cost reduction but also to reduction of radiated noise.

Further, the construction greatly reduces the number of required pins of LSIs which constitute the LED head controller built on the control circuit board 7, thereby reducing the cost of the LSIs. Only one connector 9 is required on the connection board 6, making it possible to use inexpensive circuit boards such as a single layer, low density paper phenol board which still reduces the cost.

Although the multiplexing of signals in the first embodiment has been described with respect to the bus buffers 13A–13D, a multiplexer may be used to selectively output the signals DD, DL, DK, and DS over the same signal lines. Similar advantages can also be obtained when processors are used instead of hardware in transferring the signals DD, DL, DK, and DS to the respective LED heads by way of software control. The first embodiment may also be applicable when transferring data to thermal heads and ink jet heads.

Second Embodiment

Figure 9:
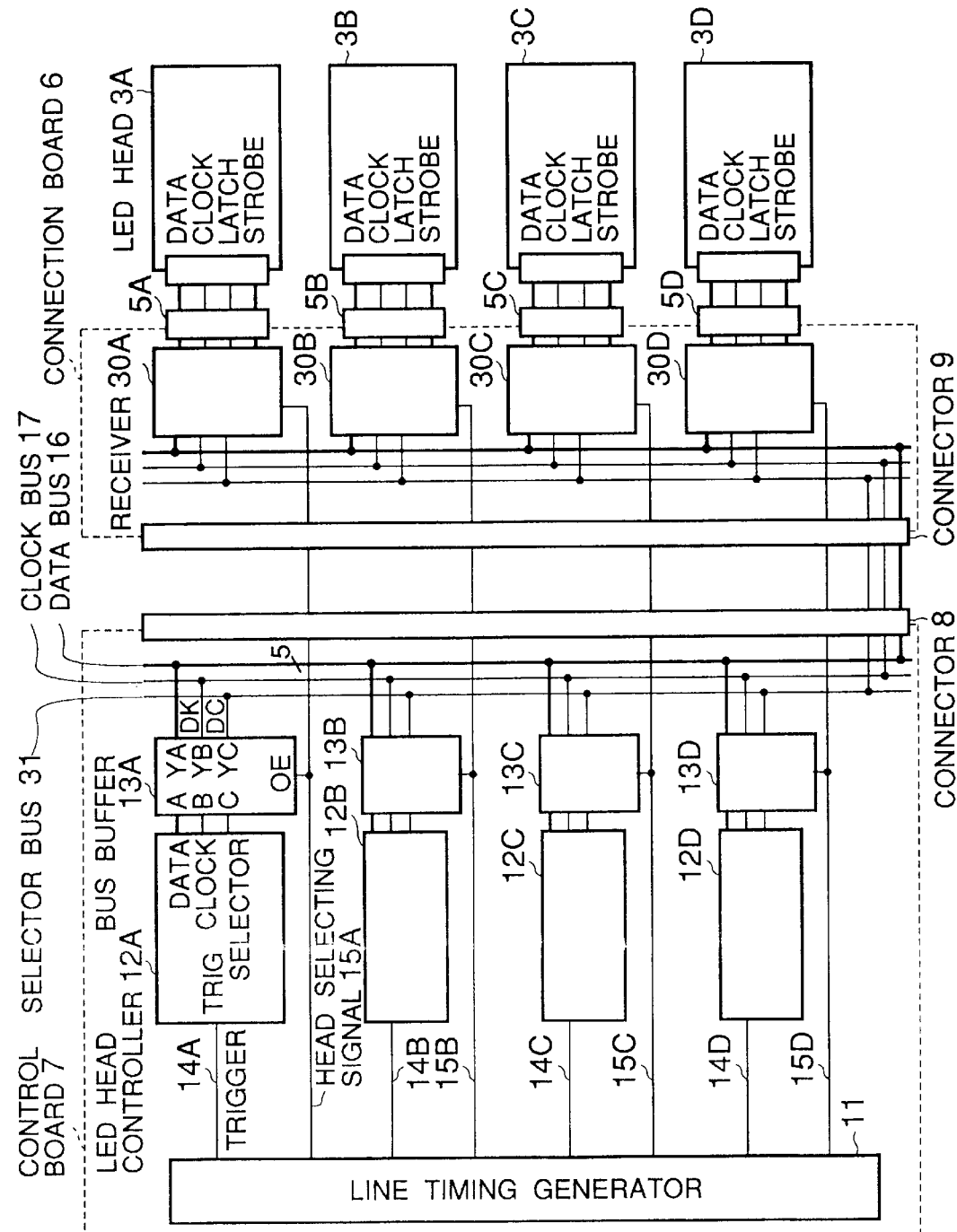
FIG. 9 is a block diagram showing a printer according to a second embodiment.

FIG. 9 is a block diagram showing a printer according to a second embodiment.

In the second embodiment, the data bus 16 is used to send not only the image data DD but also the control signals such as latch DL and strobe DS to the respective LED heads. This way of transferring image data DD reduces the number of cables required. In order to alternately transfer the data DD and the control signals DK, DL, and DS for the respective LED heads over the same set of buses, a control bus 31 is added.

In other words, the buses for connecting between the control circuit board 7 and connection board 6 includes the data bus 16, clock bus 17, and control bus 31. Receivers 30A, 30B, 30C, and 30D receive the image data DD from the LED head controllers 12A, 12B, 12C, and 12D, and supply the image data DD to the LED heads 3A, 3B, 3C, and 3D, respectively. The receivers 30A–30D are of the construction which will be described later.

Figure 10:
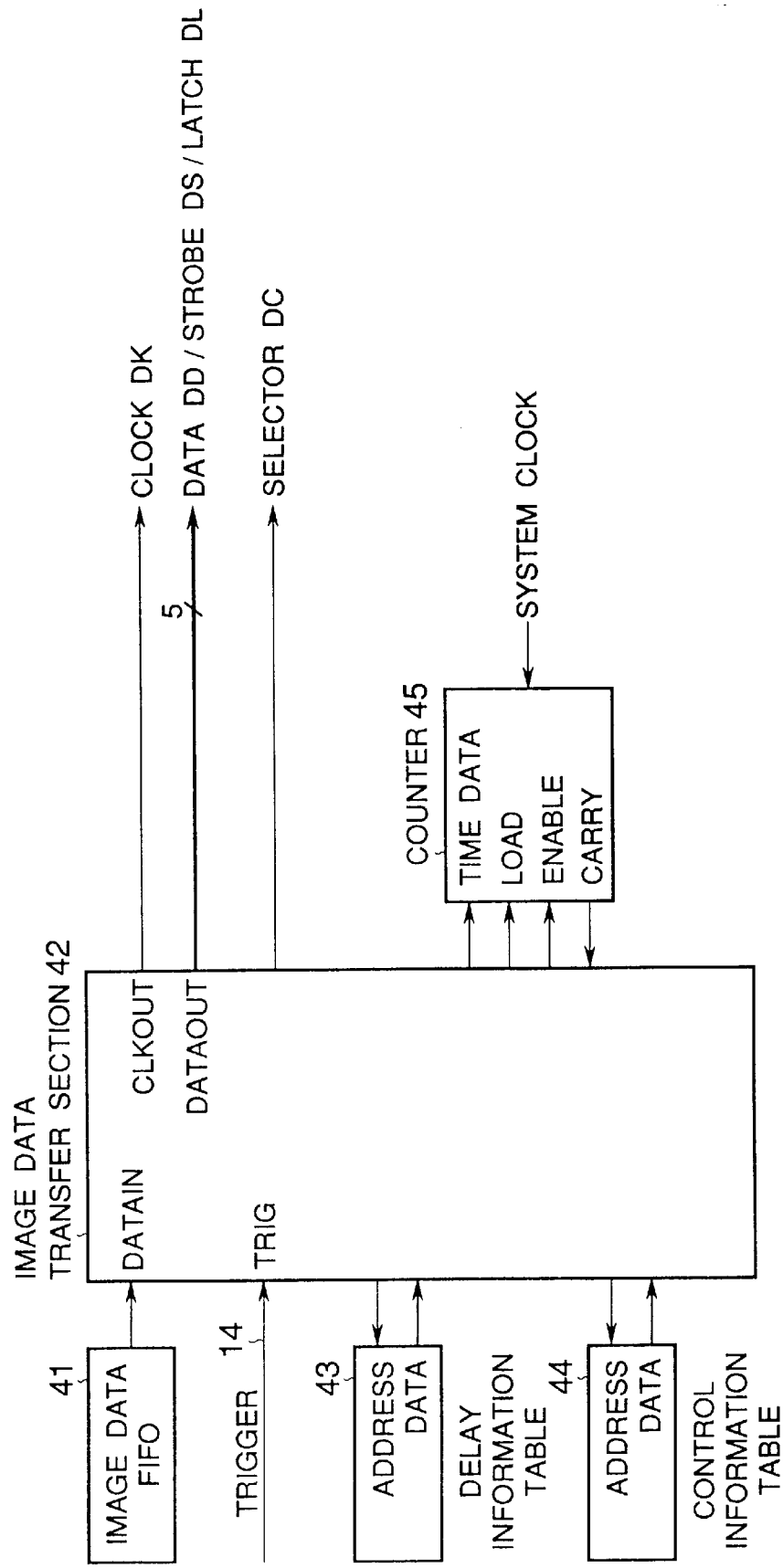
FIG. 10 is a block diagram showing an LED head controller according to the second embodiment.

FIG. 10 is a block diagram, showing an LED head controller according to the second embodiment. The LED head controller includes an image data FIFO 41 which is used for transferring the image data DD to an image data transfer section 42 in a predetermined sequence. The image transfer section 42 is connected to a time information table 43, a control information table 44, and a counter 45, and communicates the data with these sections 43, 44, and 45 to output the clock DK, image data DD, and selector signal DC. The selector signal DC indicates whether the information appearing on the data bus DD is a control signal or image data.

FIGS. 11A and 11B illustrate the contents of the control information table 44 and time information table 43, respectively. The control information table 44 lists control data. The control data is output in this order from the control information table. The control data includes four strobes DS and one latch DL. The time information table 43 lists time data T0–T6 that determine timings at which the four strobes DS and one latch DL are output.

The aforementioned construction allows transferring of control signals such as the strobe DS and latch DL over the data bus 16 which is conventionally used for transferring the image data DD, thereby reducing the number of required cables. This kind of control operation requires only a short time when transferring the control signals, and therefore reduction in speed of data transfer can be negligible.

Figure 12:
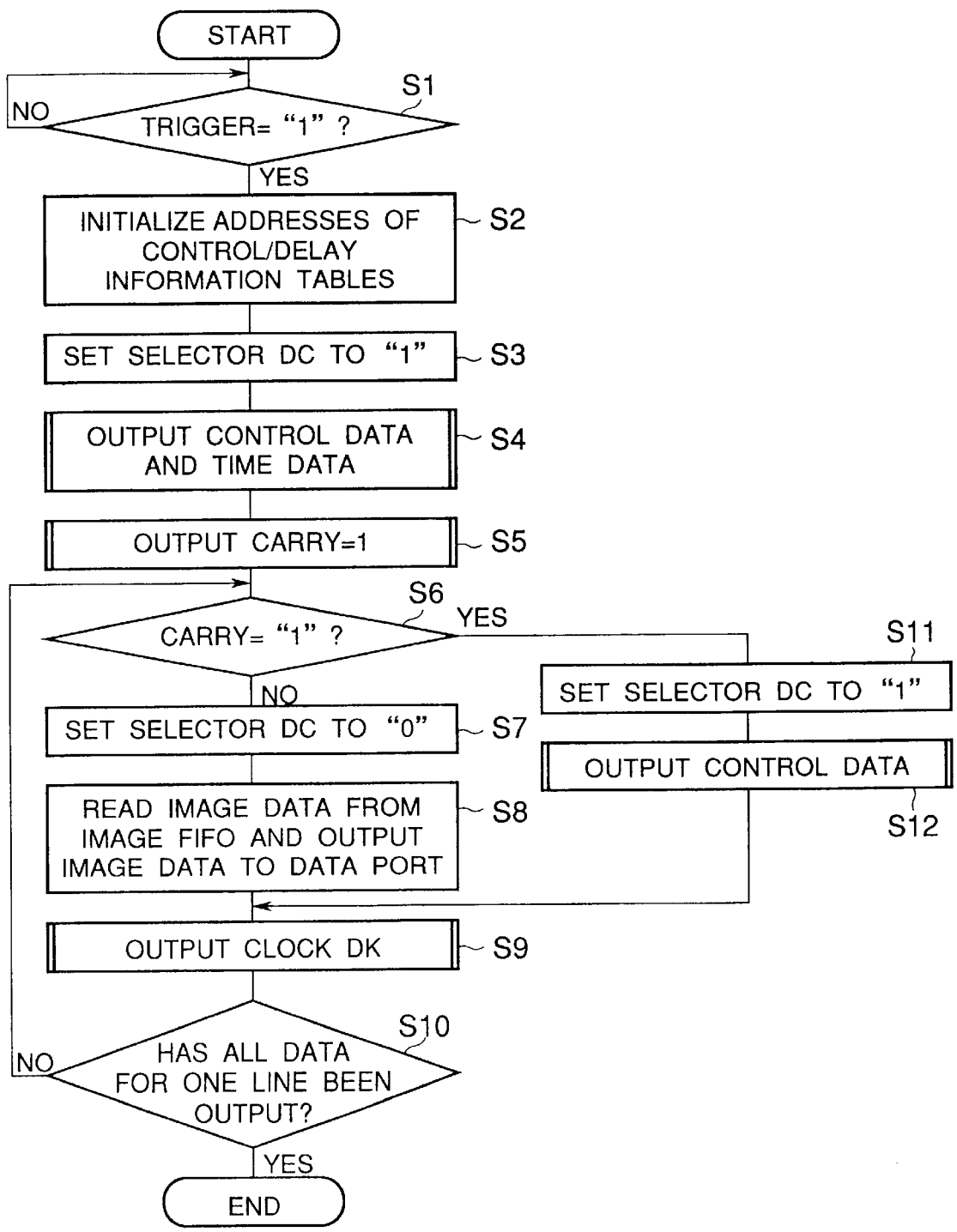
FIG. 12 is a flowchart, illustrating the LED head controller according to the second embodiment.

FIG. 12 is a flowchart, illustrating the operation of the LED head controller according to the second embodiment. At step S1, a check is made to determine whether the trigger is "1"; if the answer is YES, then the program proceeds to step S2 where initialization of the addresses of the control information table 44 and the time information table 43 is performed. In other words, the system is set up to read control data and time data from the beginning of the addresses of the tables 43 and 44, respectively. At step 3, the selector signal DC is set to "1." At step S4, the first control data "00001" is output from the control information table 44 while the time data T0 is output from the time information table 43. The counter 45 is loaded with the time data T0. Then, the counter 45 begins to count down. At step S5, the counter 45 outputs a CARRY output to the carry terminal.

At step S6, a check is made to determine whether the CARRY output of the counter 45 is "1" or not; if the answer is NO, then the program proceeds to step S7 where the selector signal DC is set to "0." This completes the preparation of the transfer of the image data DD. A step S8, the image data transfer section 42 reads the image data DD from the image data FIFO 41 and outputs the image data DD to the data port. If the answer is YES at step S6, then the program proceeds to step S11 where the selector signal DC is set to "1". The CARRY output of "1" indicates that the counter 45 has counted down to the end of time data T0. The CARRY=1 is a timing at which the next control data should be output from the control information table 44, therefore the next control data is output at step S12 from the control information table 44. Then, clocks DK are generated at step S9 and a check is made at step S10 to determine whether all the data for one line has been output to the port. If the answer is NO at step S10, the program jumps back to step S6 to repeat steps S6–S10 till all the data for one line has been output to the port.

Figure 13:
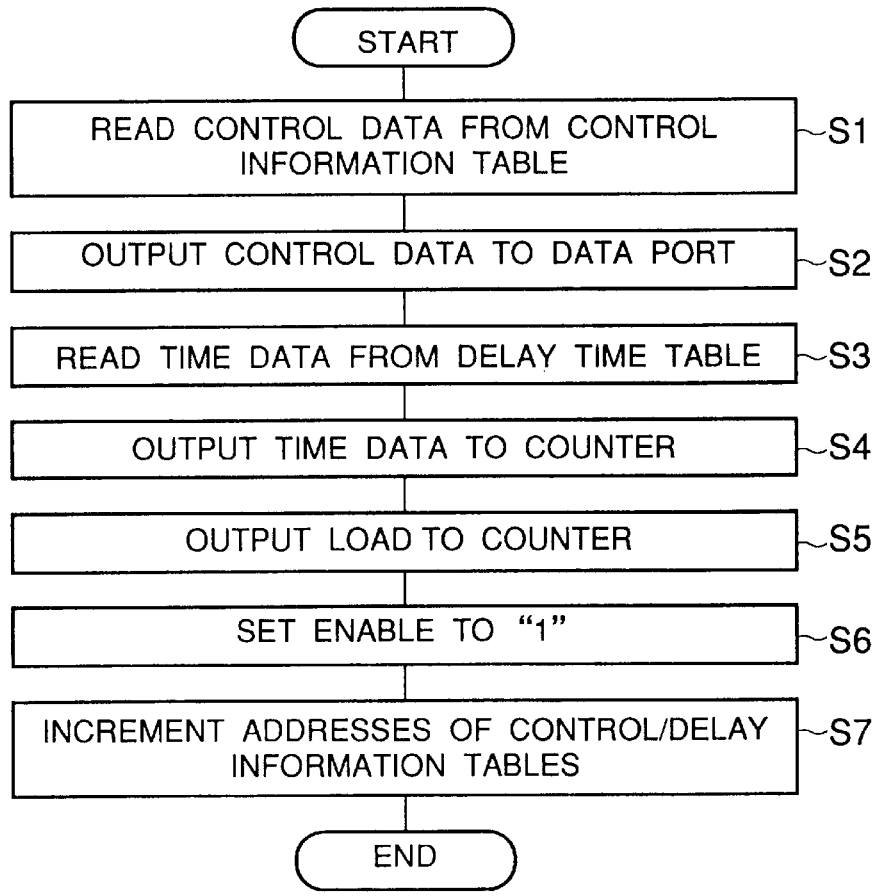
FIG. 13 is a flowchart illustrating the procedure of outputting the control information.

FIG. 13 is a flowchart, illustrating the procedure of outputting the control data from the control information table 44.

At step S1, the control data is read out from an address of the control information table 44, specified by an address pointer. At step S2, the image data transfer section 42 outputs the control data to the data port of the section 42. The image data transfer section 42 reads time data from the time information table 43 at step S3, and outputs the time data to the counter 45 at step S4, and outputs a LOAD signal to the counter 45, thereby loading the time data to the counter 45. At step S6, the image data transfer section 42 outputs an ENABLE signal of "1" to the counter 45. At step S7, the program increments the addresses of the control information table 44 and time information table 43. The counter 45 begins to count down in order to provide a timing at which the next control data should be output. Steps S1–S7 are repeated, each time for different time data (T0–T6) and control data (00001–00000), till all of the control data has been output in the order of table address.

The control data listed in the control information table 44 is 5-bit data that controls the LED head. The 5-bit data includes a 1-bit latch DL and a 4-bit strobe DS. The contents of the strobe DS are the same as those in the first embodiment. Thus, as shown in FIGS. 9 and 10, the image data DD is transferred over the 5-line data bus 16.

Figure 14:
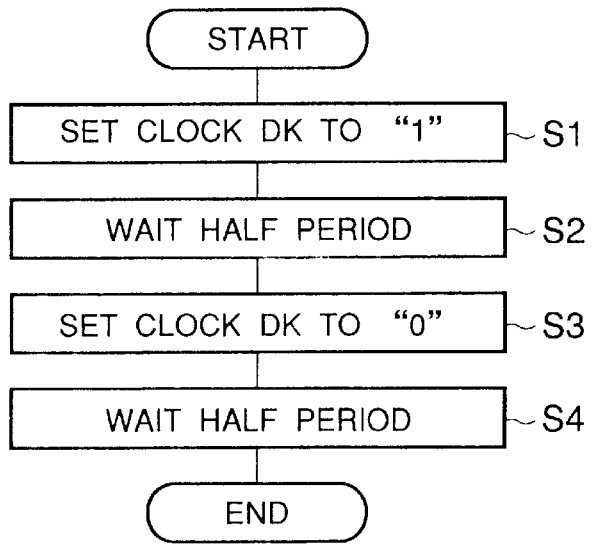
FIG. 14 is a flowchart showing the procedure for generating clocks.

FIG. 14 is a flowchart, showing the procedure for generating clocks DK. The procedure is the same as steps S4–S7 shown in FIG. 4 and description thereof is omitted.

Figure 15:
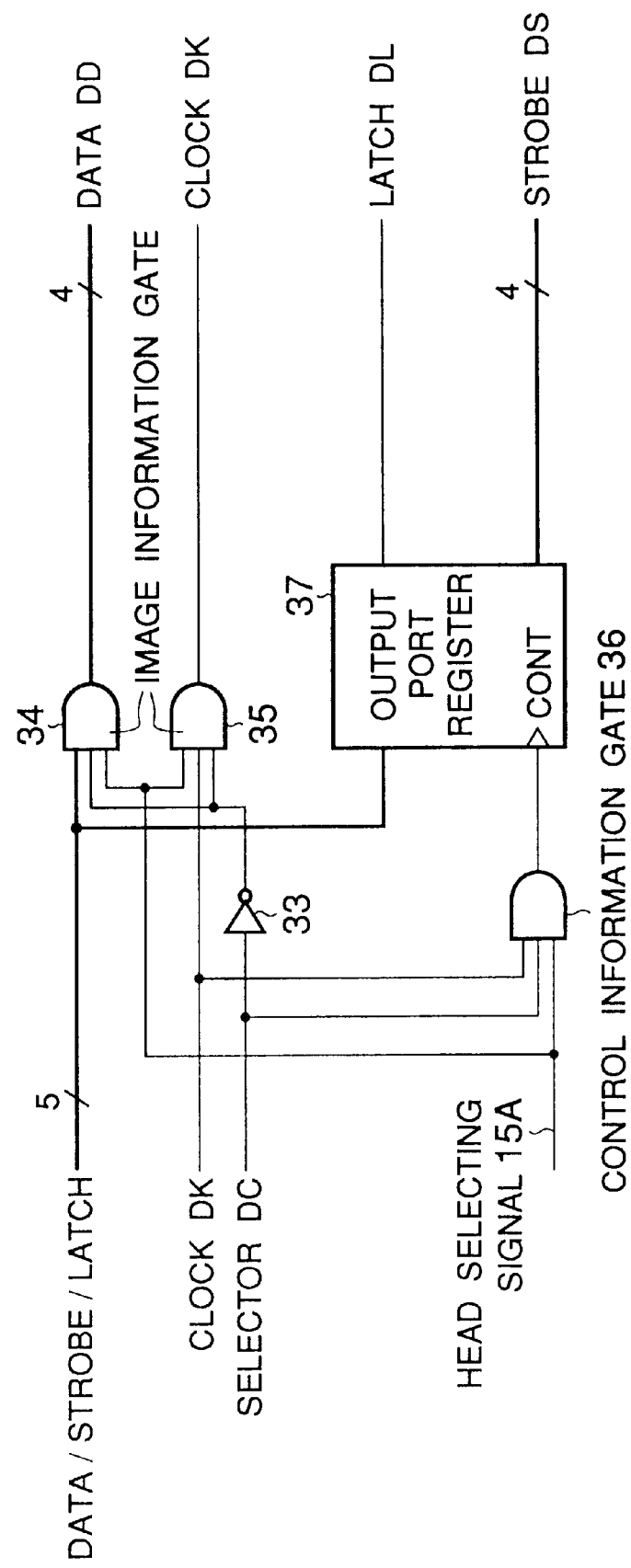
FIG. 15 illustrates a partial configuration of the receivers 30A–30D shown in FIG. 9.

FIG. 15 illustrates a part of the configuration of the receivers 30A–30D shown in FIG. 9. An inverter 33 receives the control DC and outputs an inverted output. Image information gates 34 and 35 receive the image data DD and clock DK, respectively, and an output port register 37 receives the control signals (latch DL, strobe DS). The output of a control information gate 36 is input to the control input of the output port register 37.

The head selecting signal 15A opens the image information gates 34 and 35 and control information gate 36, so that the control signals and image data appear on the output terminals of the corresponding gates. The selector signal DC is input to one of three input terminals of the control information gate 36. The selector signal DC is also input to one of the three input terminals of the image information gates 34 and 35 via an inverter 33. Thus, when the selector signal DC is "1," the image information gates 34 and 35 are closed and no outputs appear on their output terminals while the control information gate 36 is opened so that the latch DL and strobe DS appear on the output terminals of the output port register 37.

The clock DK is input to the control terminal of the output port register 37 via the control information gate 36 when the control data is valid, controlling the output port register 37 to output data stored therein at timings of the clock DK. The image information gates 34 and 35 and the output port register 37 receive the image data DD, strobe DS, and latch DL over a 5-bit bus. The value "1" of the selector signal DC indicates that the signals, i.e., strobe DS and latch DL are valid. The selector signal DC is input to the output port register 37 via the control information gate 36 and the outputs of the output port register 37 become valid. The clock DK is also input to the output port register 37 via the control gate 36, so that the latch DL and strobe DS are output at predetermined timings.

When the selector signal DC is "0," the image information gates 34 and 35 are opened, so that the image data DD is output from the image information gate 34 and the clock DK is output from the image information gate 35. In this manner, the control signals DK, DL, and DS and image data DD for the respective LED heads are multiplexed by time-division control and transferred over the same buses 17 and 16 to the heads.

Figure 16:
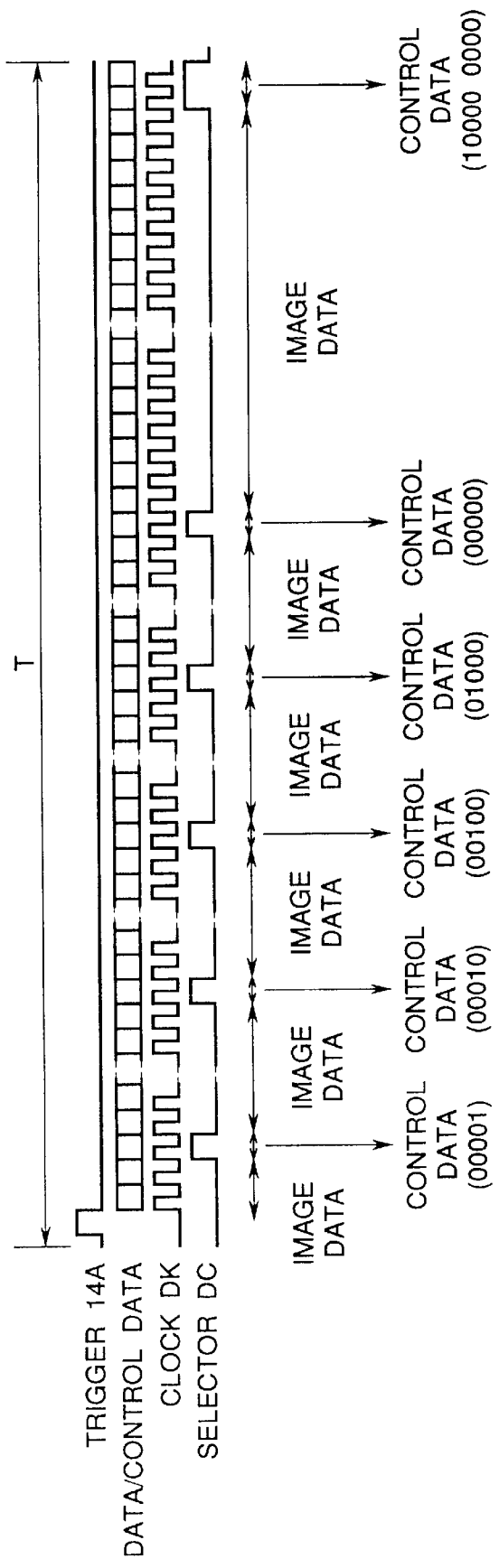
FIG. 16 illustrates data for one line output from the LED head controller according to the second embodiment.

FIG. 16 illustrates the image data DD for one line which is output from the LED head controller according to the second embodiment. By way of example, the image data DD for the LED head 3A is shown in FIG. 16.

Upon the trigger 14A, the head controller 12A begins to transfer of the image data DD for the present one line beings. When the selector signal DC is low, the image data DD is transferred on the clock DK over the data bus 16. When the selector signal DC is high, the control data (DL or DS) is transferred on the clock DK over the data bus 16. In this manner, the image data DD and associated control data (DL or DS) are transferred in alternating fashion at predetermined timings under the control of the selector signal DC. It is to be noted that the selector signal DC allows the control data to pass so that the control data drive the LEDs in the LED head with the image data DD for one line which has been latched at the end of the previous period T during which the image data for the previous one line was transferred to that LED head.

Figure 17:
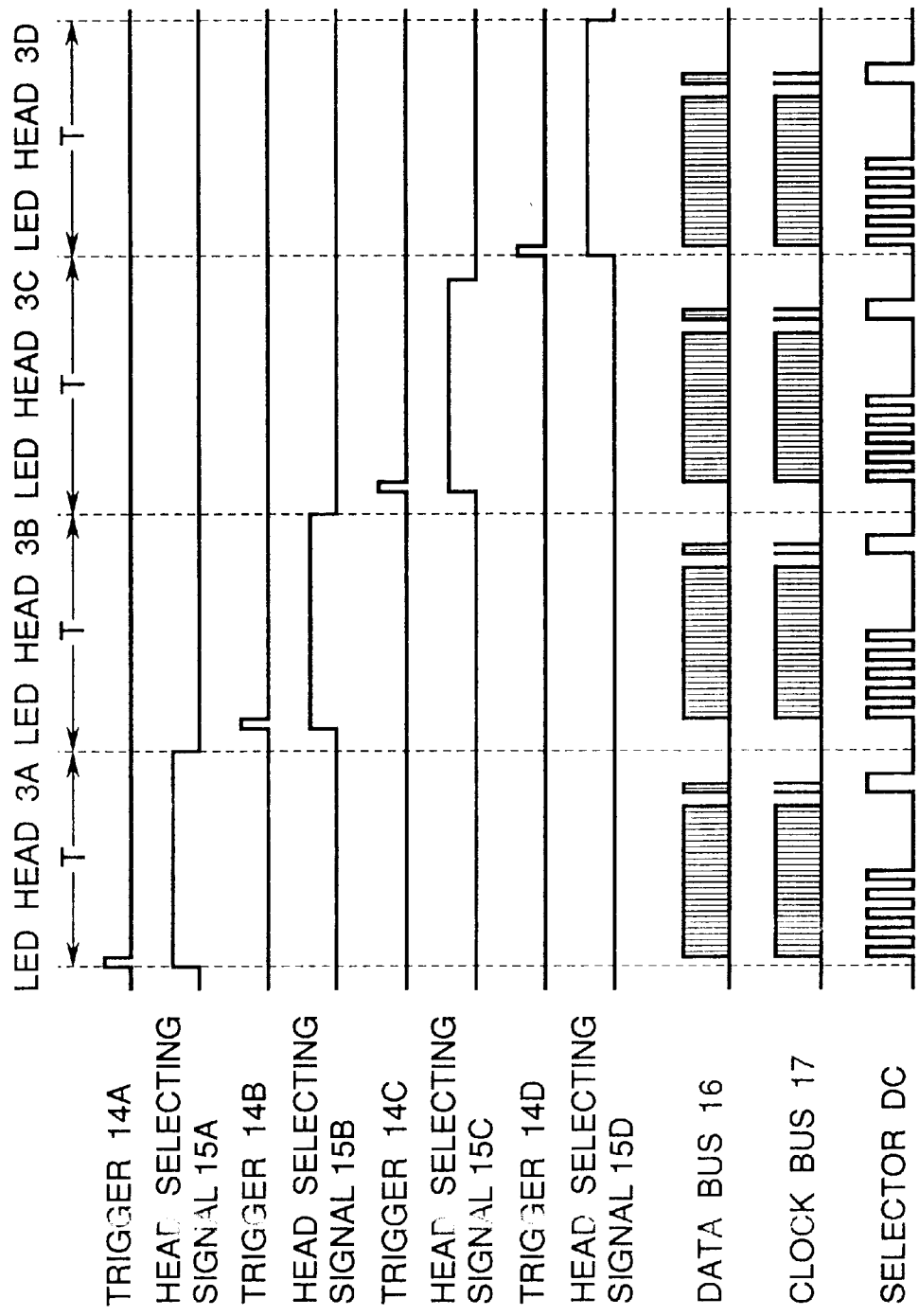
FIG. 17 is a timing chart of the signals on the bus.

FIG. 17 is a timing chart of various signals on the buses.

The contents of the triggers 14A–14D and head selecting signals 15A–15D for the LED head controllers 12A–12D are the same as those in the first embodiment. Signals on the data bus 16 and on the clock bus 17 are substantially the same as those in the first embodiment. However, it is to be noted that the selector signal DC becomes "1" at predetermined timings. The latch DL and strobe DS are transferred when the selector signal DC remains "1." In this manner, the image data DD and control data DL and DS are multiplexed and then supplied to the respective heads.

Advantages of the Second Embodiment

The same set of cables is used both for transferring the image data DD and for transferring the control data DL and DS, thereby multiplexing the signals further than the first embodiment. Therefore, the second embodiment offers advantages of miniaturizing of the circuits and further reducing the total number of cables and manufacturing cost.

Third Embodiment

Figure 18:
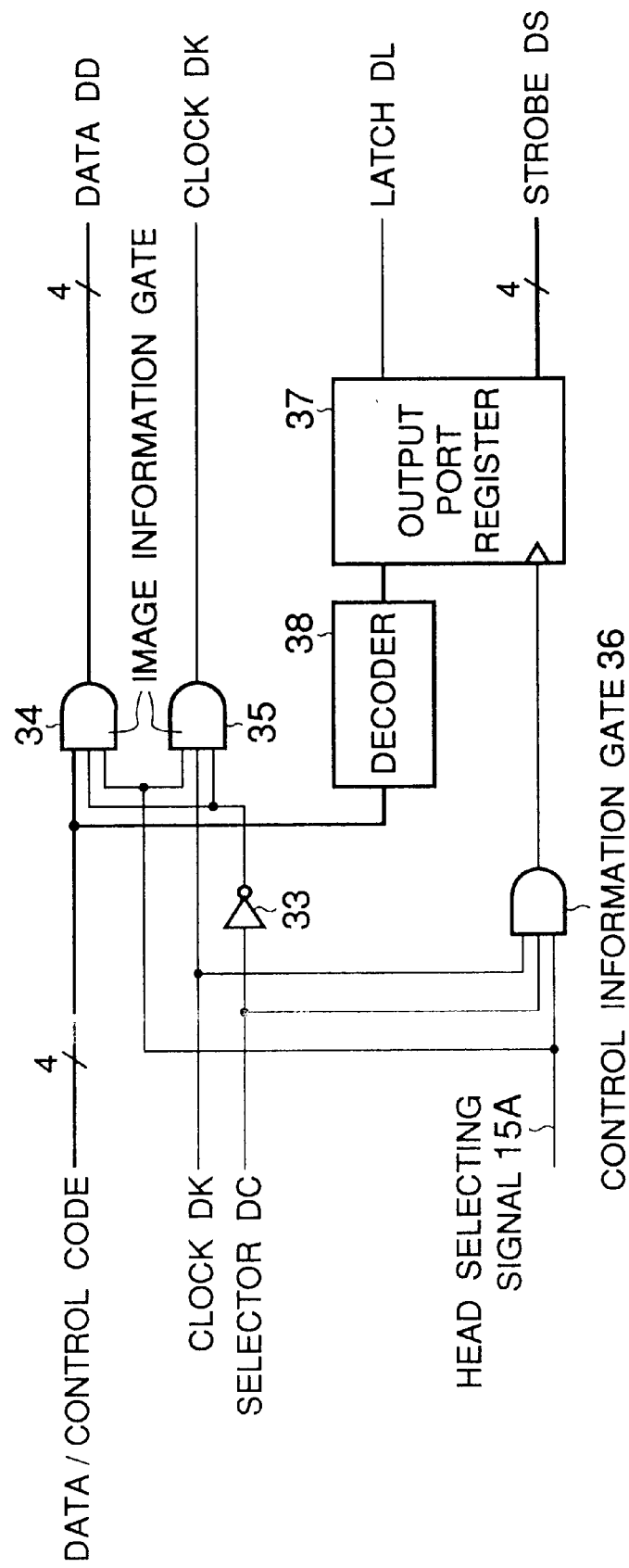
FIG. 18 illustrates an actual circuit of the receivers 30A–30D of a third embodiment.

FIG. 18 illustrates an internal circuit of the receivers 30A–30D according to a third embodiment. Most of the part of the third embodiment is the same as that of the second embodiment. The third embodiment differs from the second embodiment only in the circuit configuration of the receivers 30A–30D.

The second embodiment employs 5 lines for the data bus 16 in order to transfer the image data and control data over the same bus.

The 5 lines include 4 lines for the strobe DS and 1 line for the latch DL. However, coding the signals makes it possible to further reduce the number of lines. In other words, the control data can be sent over the data bus of 4 lines. The third embodiment differs from the second embodiment in this respect.

FIG. 19A illustrates a control information table 44 and FIG. 19B shows a time information table 43. Referring to FIG. 19A, the table 44 lists control codes for Strobe 1, Strobe 2, and Strobe 3, Reset, Latch, and Reset stored in consecutive addresses. Thus, the contents in the control information table are substantially the same as those in the second embodiment but the control codes are expressed in 4 bits. The contents (T0–T6) in the time information table are the same as those in the second embodiment.

FIG. 20 illustrates the code assignment of the 5-bit pattern which appears on the output port of the control information table when the codes are read out. The 5-bit patterns of "latch plus strobe" are "00000," "00001," "00010," "00100," "01000," and "10000," which are converted into the 4-bit codes have values "0000," "0001," "0010," "0100," and "0101," respectively. The 4-bit patterns are sent over the data bus 16 shown in FIG. 9.

The receiver shown in FIG. 18 is the same as that of the second embodiment except that a decoder 38 is added. Upon receiving a control code over the data bus 16, the decoder 38 generates a corresponding bit pattern listed in FIG. 20. The generated bit pattern is stored in the output port register 37 which in turn outputs the corresponding Latch DL and strobe DS. In this manner, the image data DD and control data DL and DS can be transferred over the same bus of a minimum number of signal lines.

Advantages of the Third Embodiment

Coding the control data into binary codes in the aforementioned manner per permits driving of the LED heads using a minimum number of signal lines. Besides this advantage, the third embodiment also offers advantages which the second embodiment provides.

Fourth Embodiment

Figure 21:
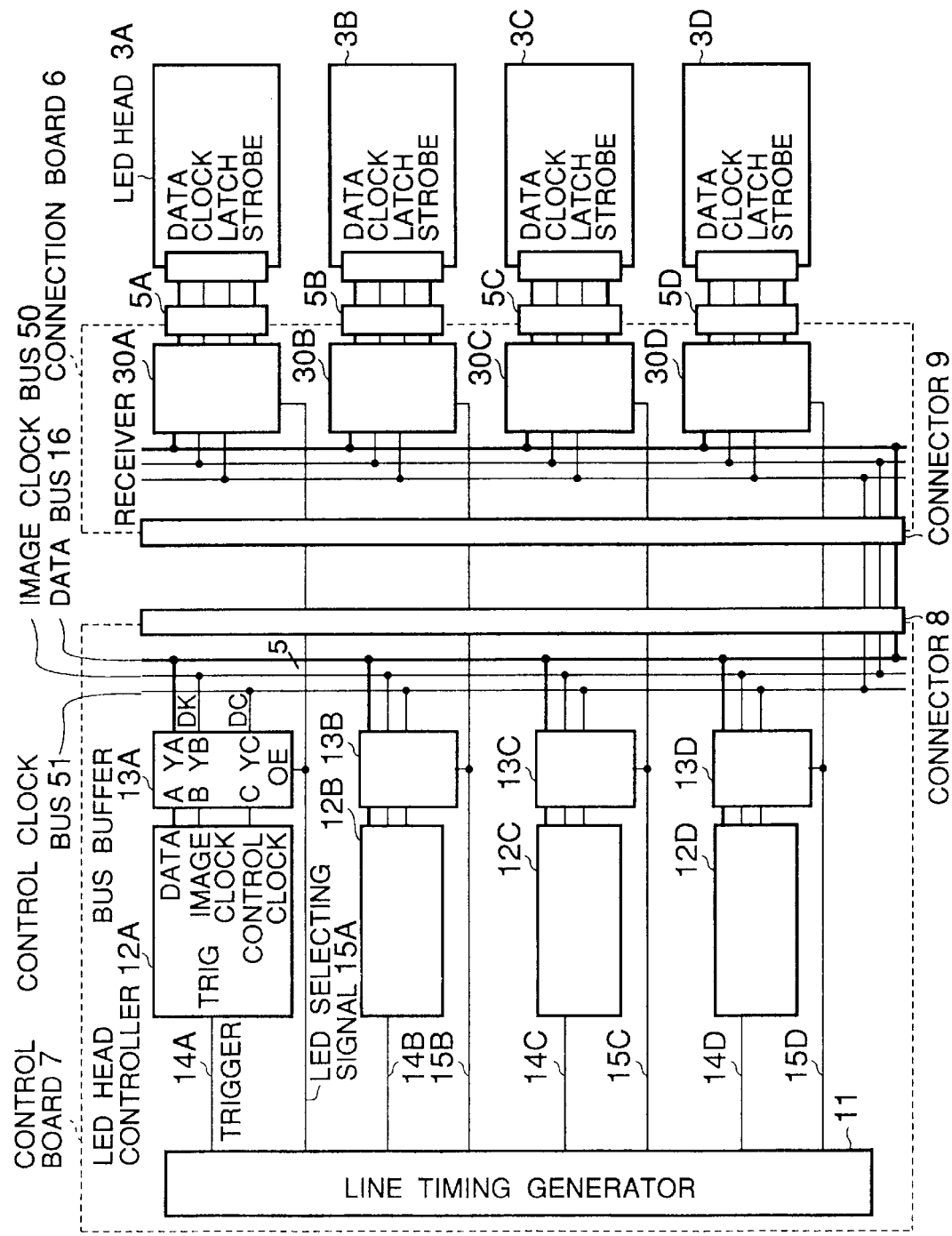
FIG. 21 is a block diagram showing a relevant part of a printer according to a fourth embodiment.

FIG. 21 is a block diagram showing a relevant part of a printer according to a fourth embodiment.

The fourth embodiment differs from the first to third embodiments in that signals which the LED head controllers 12A–12D output to the bus buffer 13A–13D are image data DD, strobe DS, latch DL, image clock GK, and control clock SK.

There are provided an image clock bus 50 over which the image clock GK is transferred, a control clock bus 51 over which the control clock SK is transferred, and a data bus 16 over which the image data DD, latch DL, and strobe DS are transferred.

Figure 22:
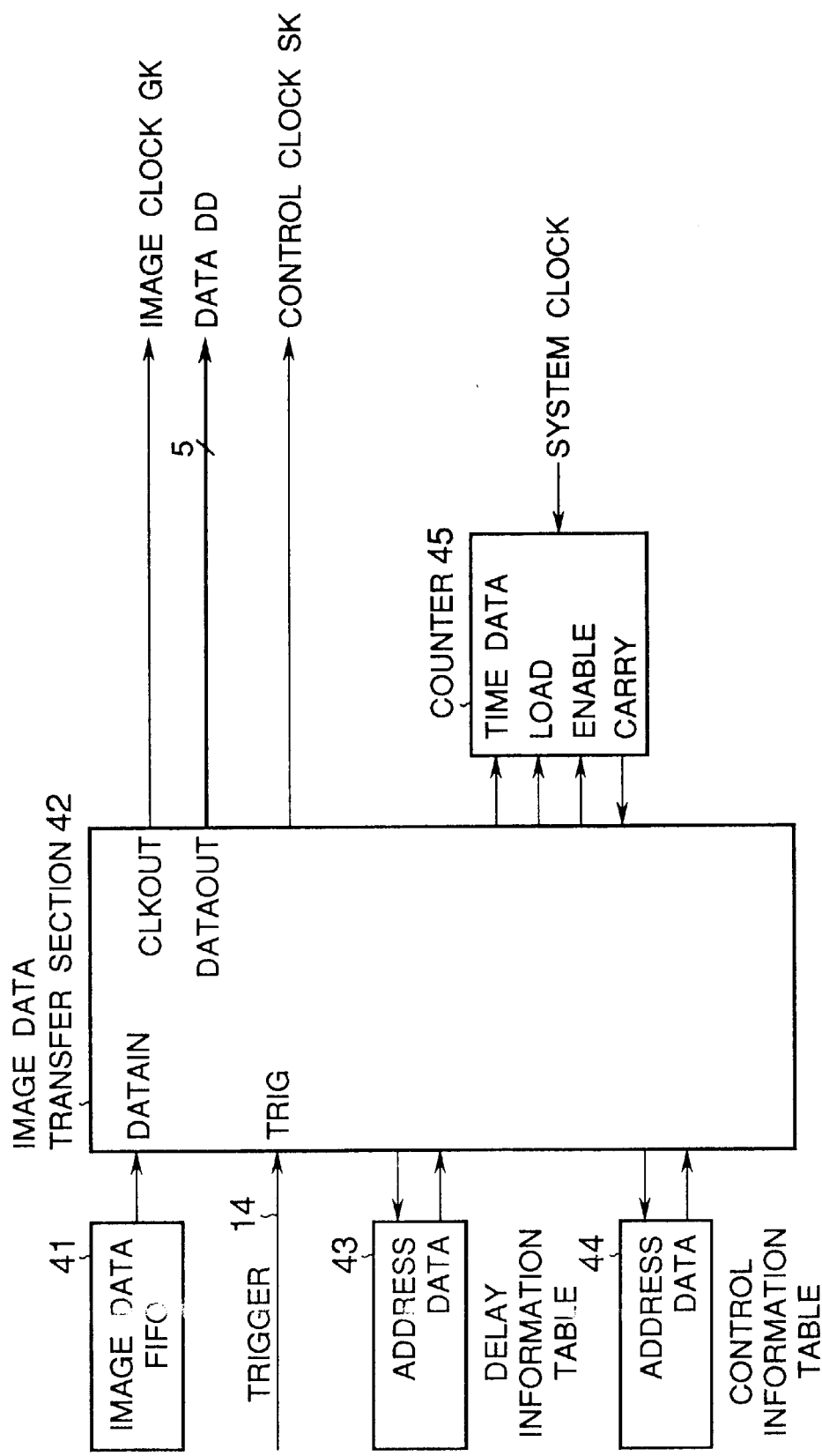
FIG. 22 is a block diagram showing the LED head controller according to the fourth embodiment.

FIG. 22 is a block diagram, showing the LED head controller according to the fourth embodiment.

The circuit shown in FIG. 22 is much the same as that shown in FIG. 10 except that an image data transfer section 42 outputs a 5-bit signal, image clock GK, and control clock SK. Of the five bits of the 5-bit signal, four bits are used for image data DD when the image data DD is transferred over the data bus 16, and five bits are used when strobe DS (4-bit signal) and latch DL (1-bit signal) are transferred over the data bus 16.

Figure 23:
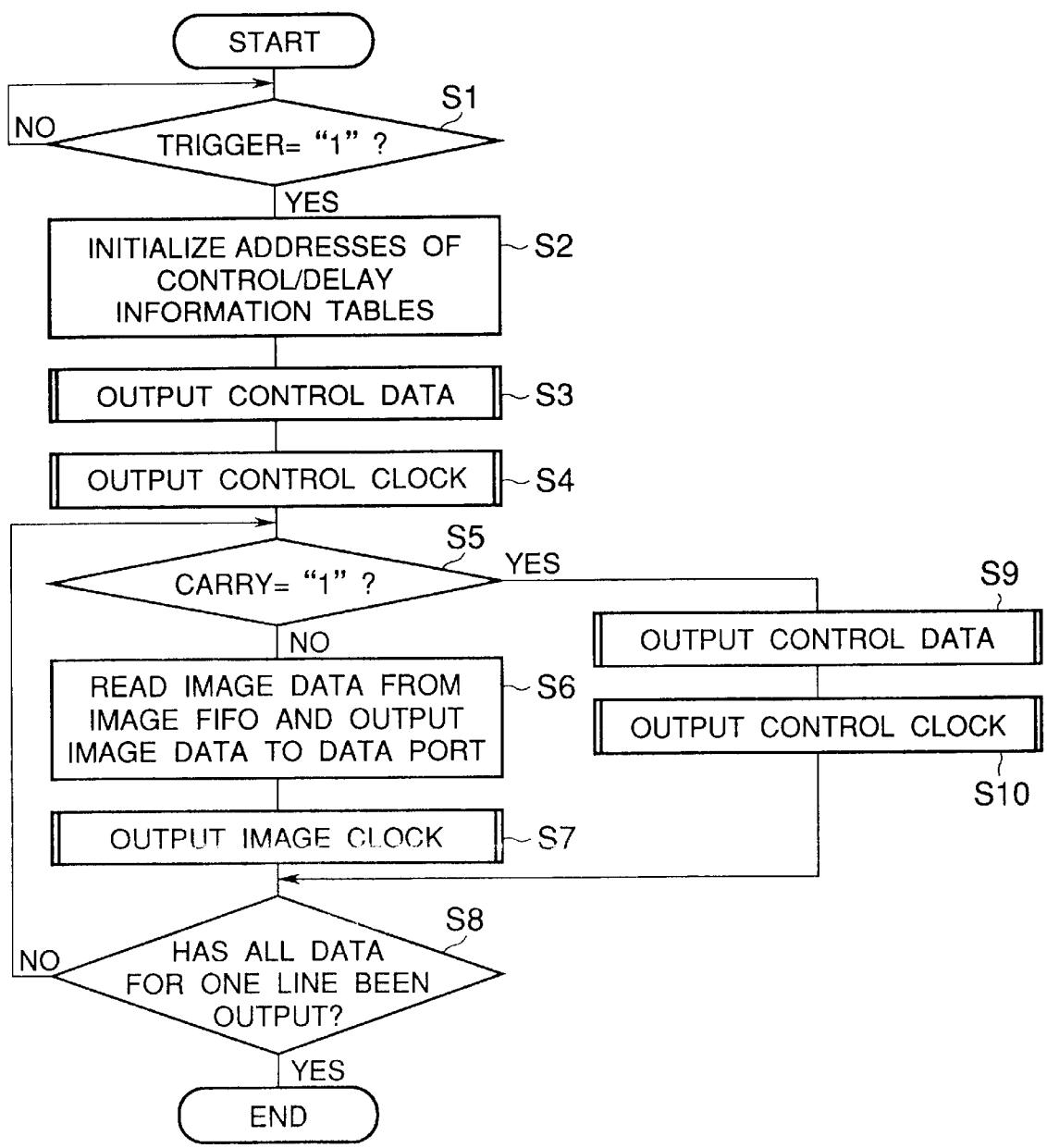
FIG. 23 is a flowchart illustrating the operation of the LED head controller.

FIG. 23 is a flowchart illustrating the operation of the LED head controller.

At step S1, a check is made to determine whether the trigger 14 is "1." If the answer is YES at step S1, then the program proceeds to step S2 where the addresses of the control information table 44 and time information table 43 are initialized Just as in the second embodiment. At step S3, the control data is output from the control information table 44, and at step S4, the control clock SK is generated.

At step S5, a check is made to determine whether the CARRY output of the counter 45 is "1"; if the answer is NO, then the program proceeds to step S6 where the image data transfer section 42 reads the image data DD from the image data FIFO 41 and outputs the image data DD to the data port. A step S7, the image clock GK is generated. If the answer is YES at step S5, the program proceeds to step S9 where the control data is output. Then, the program proceeds to step S10 where the control clock SK is generated. At step S8, a check is made to determine whether all of the data for one line has been output; if the answer is NO, the steps S5–S10 are repeated till the answer is YES.

Figure 24A:
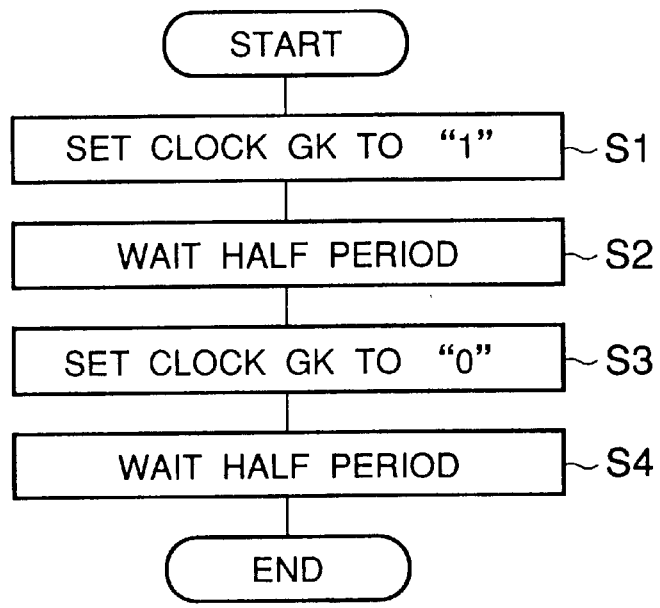
FIGS. 24A and 24B illustrate the procedures for generating image clock GK and control clock SK, respectively.
Figure 24B:
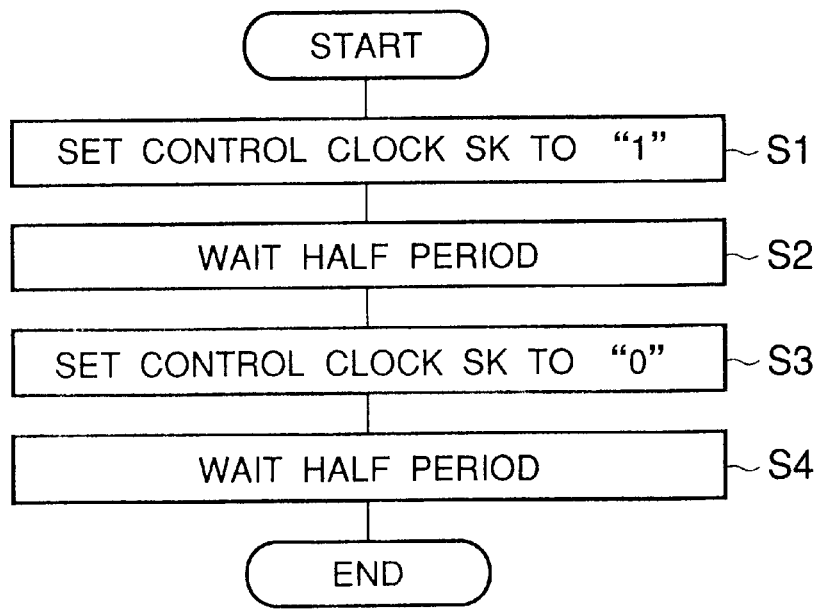

FIGS. 24A and 24B illustrate the procedures for generating image clock GK and control clock SK, respectively.

Referring to FIG. 24A, the image clock GK is set to "1" at step S1, and is allowed to remain "1" for a half period at step S2. The image clock GK is set to "0" at step S3 and is allowed to remain "0" for a half period at step S4.

Referring to FIG. 24B, the control clock SK is set to "1" at step S1 and is allowed to remain "1" for a half period at step S2. The control clock is SK set to "0" at step S3 and is allowed to remain "0" for a half period at step S4. In this manner, the image clock GK and the control clock SK are generated.

Figure 25:
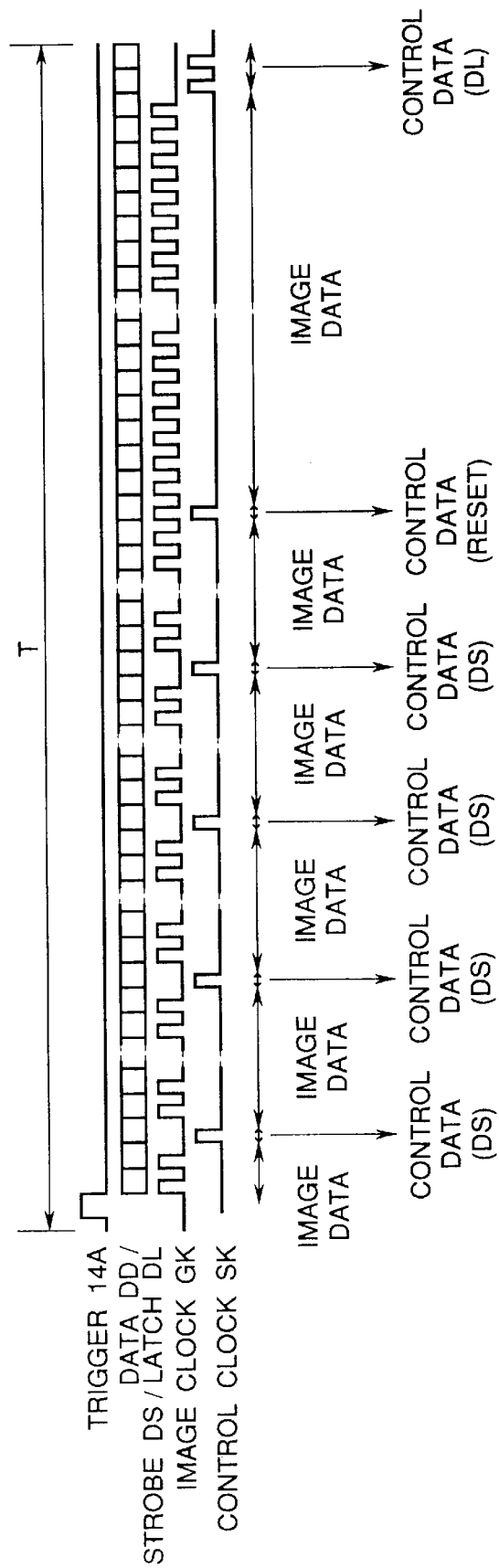
FIG. 25 illustrates data for one line handled by the LED head controller according to the fourth embodiment.

FIG. 25 illustrates the data for one line handled by the LED head controller according to the fourth embodiment. By way of example, the image data DD and signals DL and DS are illustrated with respect to the LED head controller 12A.

Upon the trigger 14A, the LED head controller 12A begins to transfer the image data DD for the present one line. When the image data DD is transferred over the data bus 16, the image data DD is attended by the image clock GK. When the control data DS and DL are output over the data bus 16, the control data DS and DL are attended by the control clock SK.

In this manner, the image data DD and control data DS and DL are multiplexed and transferred over the same cables, being attended by corresponding clocks. i.e., image clock GK or control clock SK. This multiplexing still reduces the number of required cables.

Figure 26:
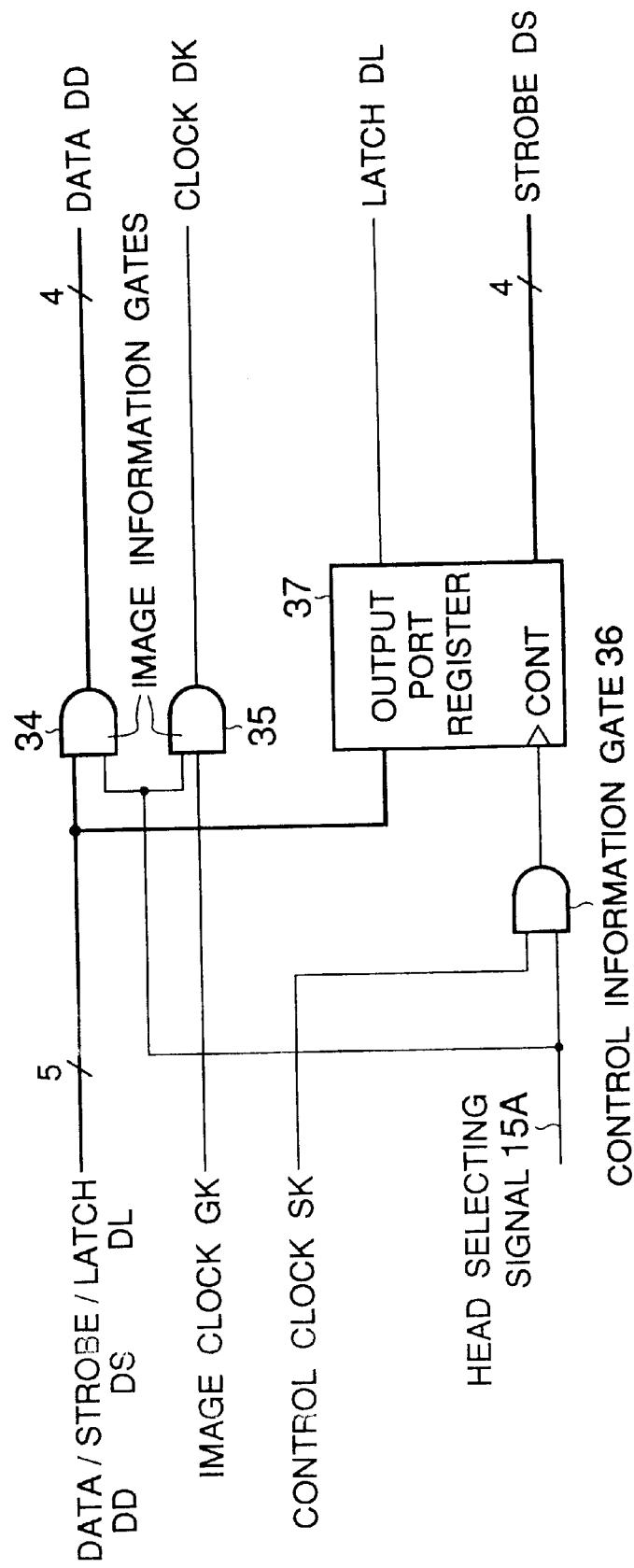
FIG. 26 illustrates an actual circuit of the receivers of a fourth embodiment.

FIG. 26 illustrates a specific circuit of the receivers of the fourth embodiment.

The circuit includes image information gates 34 and 35, control information gate 36, and output port register 37. The head selecting signal 15A controls the image information gates 34 and 35 and control information gate 36 to simultaneously open and close. The image data DD is input to the image information gate 34 and output as the image data DD. The image clock GK is input to the image information gate 35 and output as the clock DK from the image information gate 35. The strobe DS and latch DL are input to the control port register 37. The control clock SK is input via the control information gate 36 to the control terminal of the output port register 37, so that the strobe DS and latch DL are loaded to the output port register 37 upon the control clock SK.

When the control data such the strobe DS and latch DL are input to the circuit in FIG. 26, the output port register 37 holds these signals and outputs upon the control clock SK. In other words, since the strobe DS and latch DL are input to the circuit at the same time as the control clock SK, the strobe DS and latch DL are output to a corresponding head through the output port register 37. The image data DD is input to the circuit at the same time as the image clock GK. Therefore, the image data DD is transferred to a corresponding head via the image information gate 34 while the image clock GK is transferred to a corresponding head via the image information gate 35.

Figure 27:
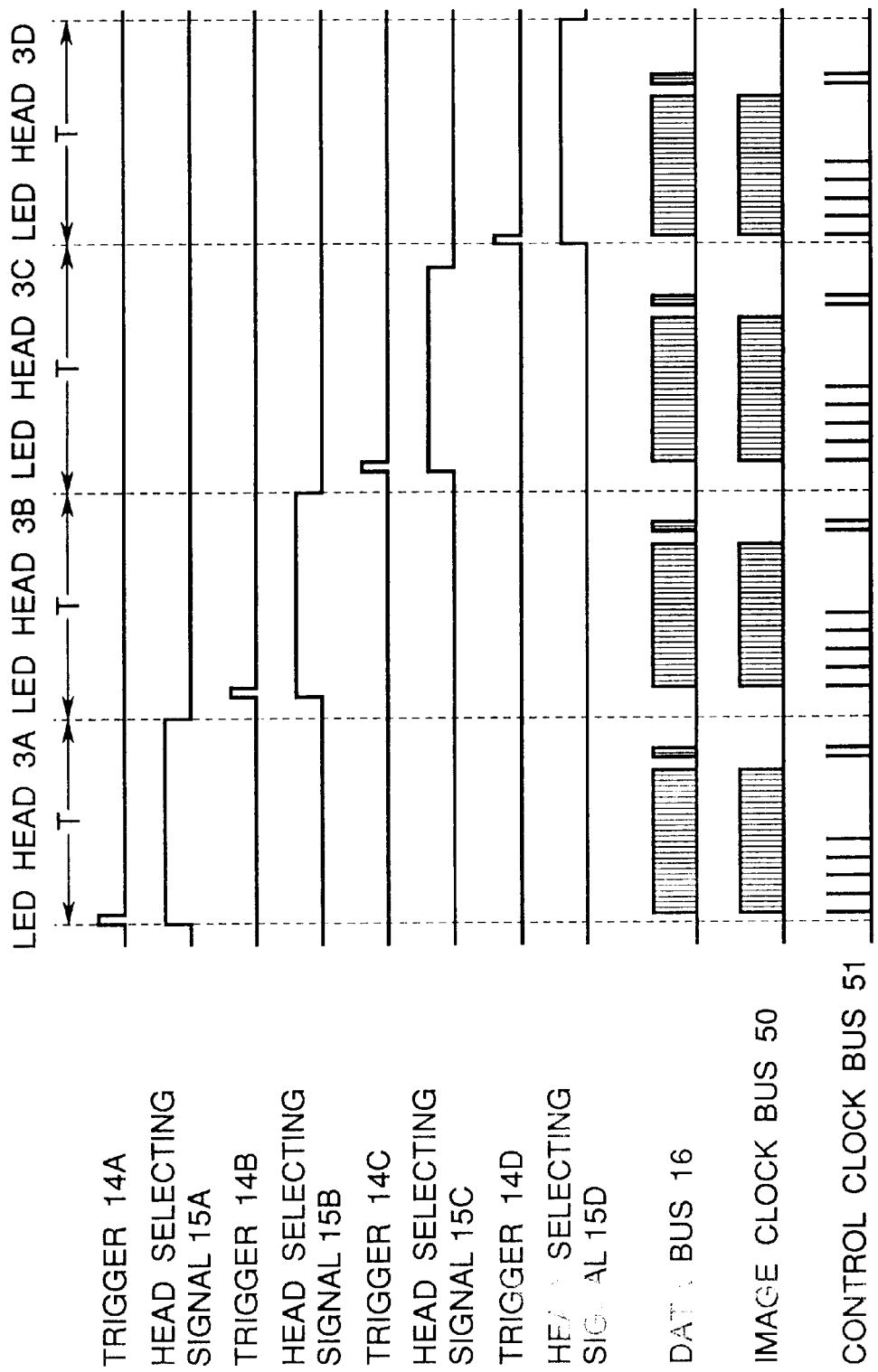
FIG. 27 is a timing chart of the signals on the buses.

FIG. 27 is a timing chart of the signals on the buses.

The image data DD and control data DS and DL for one line are transferred alternately over the data bus 16 in timed relation with the image clock GK on the image clock bus 50, and the control clock SK on the control clock bus 51, respectively. The signals are sent to corresponding LED head at timings which have been described with reference to FIG. 8 in the first embodiment.

The two closely located control clocks allow the receiver 30A–30D to properly receive the latch DL so that the present image data DD is latched at the end of period T. However, the strobe DS transferred concurrently with the image data DD for the present one line is used to drive the LEDs in the respective LED head in accordance with the image data DD for the previous one line which has been previously latched.

Advantages of the Fourth Embodiment

As mentioned above, the image clock GK and control clock SK are output at the same time as the image data DD and the strobe DS and the latch DL. Thus, the image data DD can be transferred alternately with the control data DS and DL at predetermined timings, thereby multiplexing the image data DD and control data DS and DL. Thus, the fourth embodiment reduces the number of required cables while still providing the same advantages as the first embodiment.

Fifth Embodiment

Figure 28:
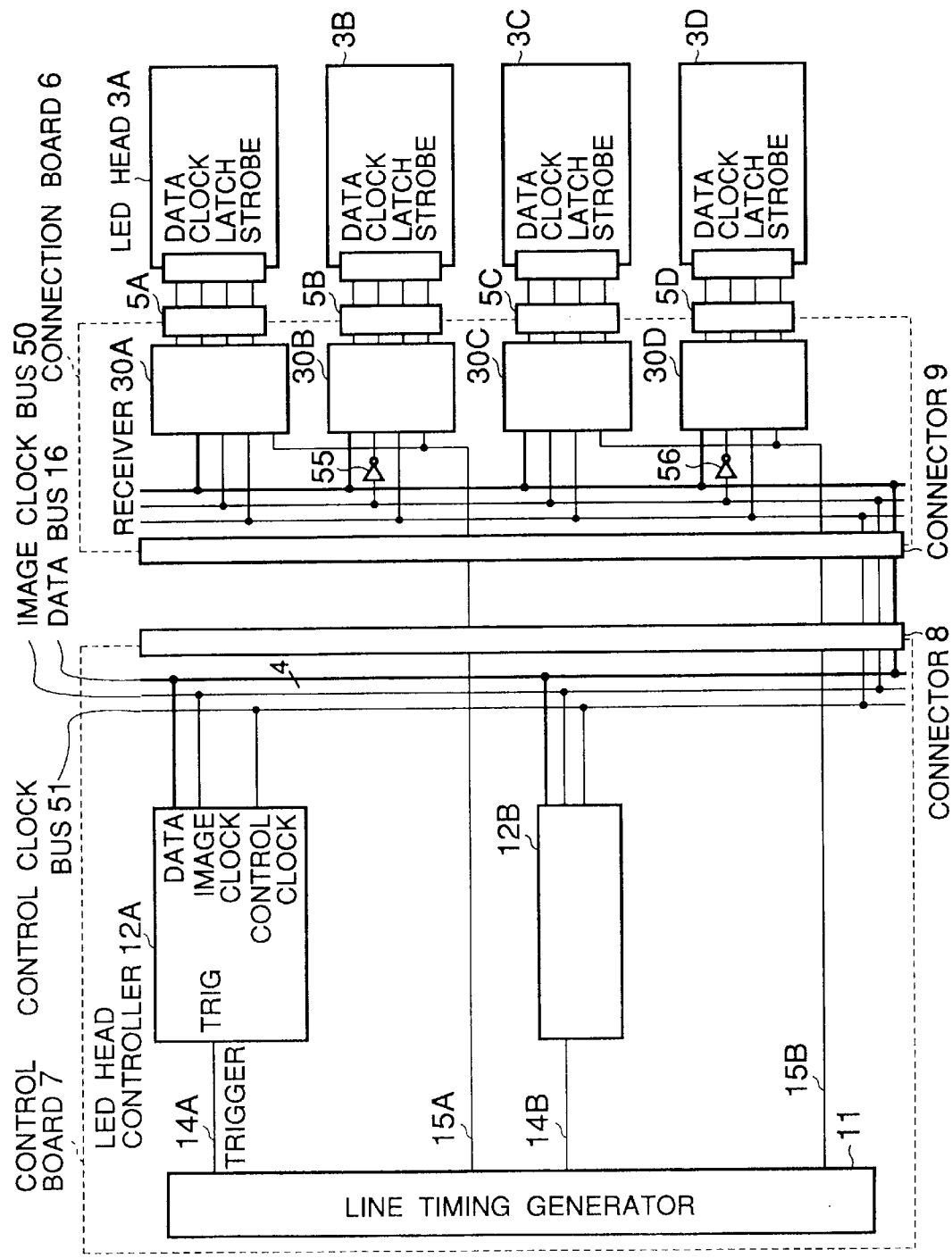
FIG. 28 is a block diagram illustrating a relevant portion of a printer according to a fifth embodiment.

FIG. 28 is a block diagram illustrating a relevant portion of a printer according to a fifth embodiment.

The control circuit board 7 has an LED head controller 12A that transfers data and clocks to LED heads 3A and 3B, and an LED head controller 12B that transfers data and clocks to LED heads 3C and 3D. Trigger signals 14A and 14B for controlling the LED head controllers are supplied from a line timing generator 11. The buses over which the control circuit board 7 communicates with the connection board 6 (FIG. 36) include data bus 16, image clock bus 50, and control clock bus 51.

The connection board 6 has receivers 30A and 30B which are controlled by the head selecting signal 15A, and receivers 30C and 30D which are controlled by the head selecting signal 15B. The receivers 30A, 30B, 30C, and 30D are connected to the LED heads 3A, 3B, 3C, and 3D, respectively. The signals supplied via the image clock bus 50 are inverted by inverters 55 and 56 and directed to the receivers 30B and 30D, respectively.

Figure 29:
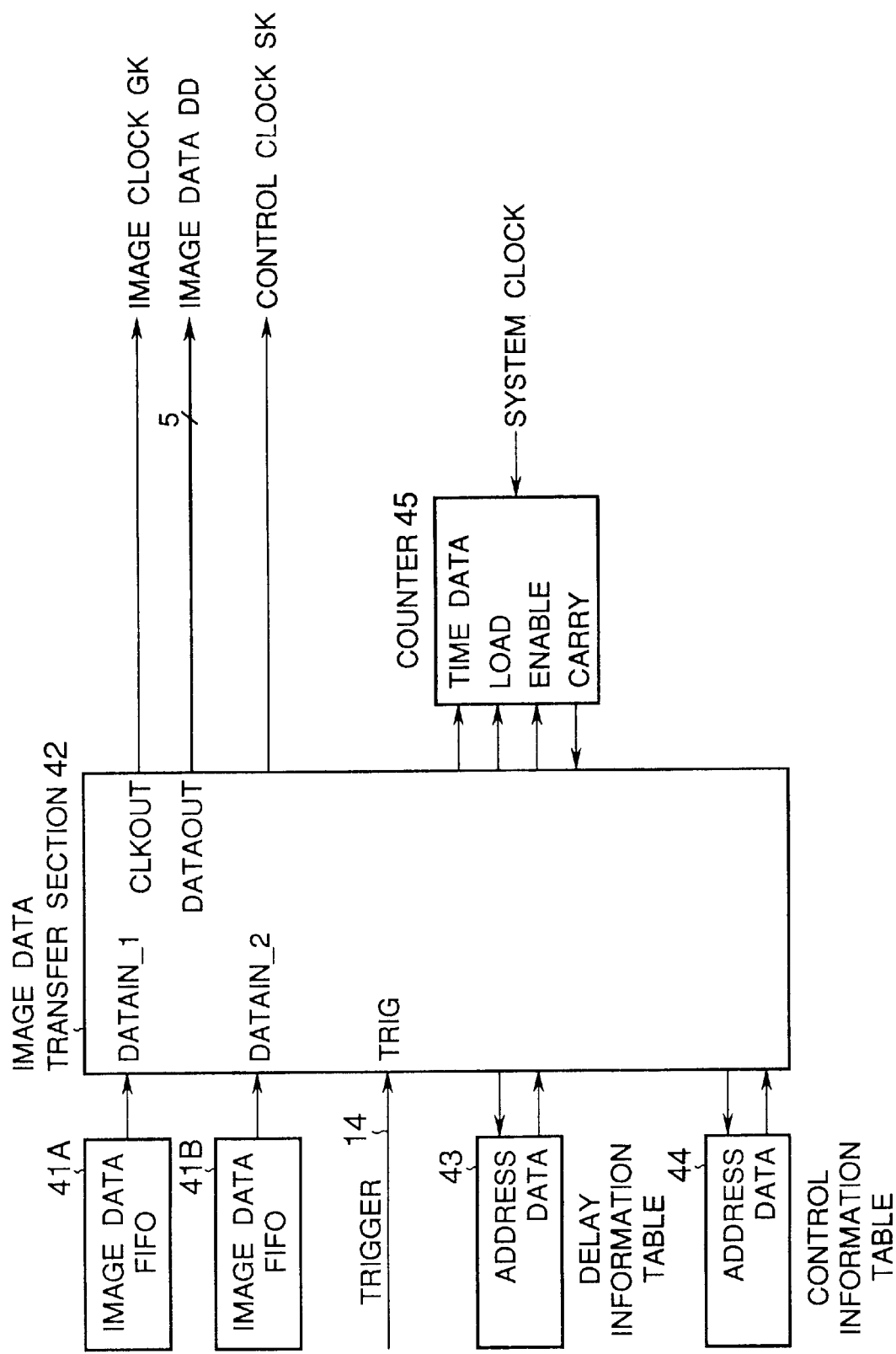
FIG. 29 is a block diagram of the LED head controller of the fifth embodiment.

FIG. 29 is a block diagram of the LED head controller of the fifth embodiment.

Unlike the first to fourth embodiments, the image data transfer section 42 receives data from two image data FIFOs 41A and 41B. The time information table 43, control information table 44, and counter 45 are of the same configuration as those of the first, second, and fourth embodiments. The image data transfer section 42 outputs 5-bit data, image clock GK, and control clock SK. The contents of the 5-bit data is exactly the same as those of the fourth embodiment.

Figure 30:
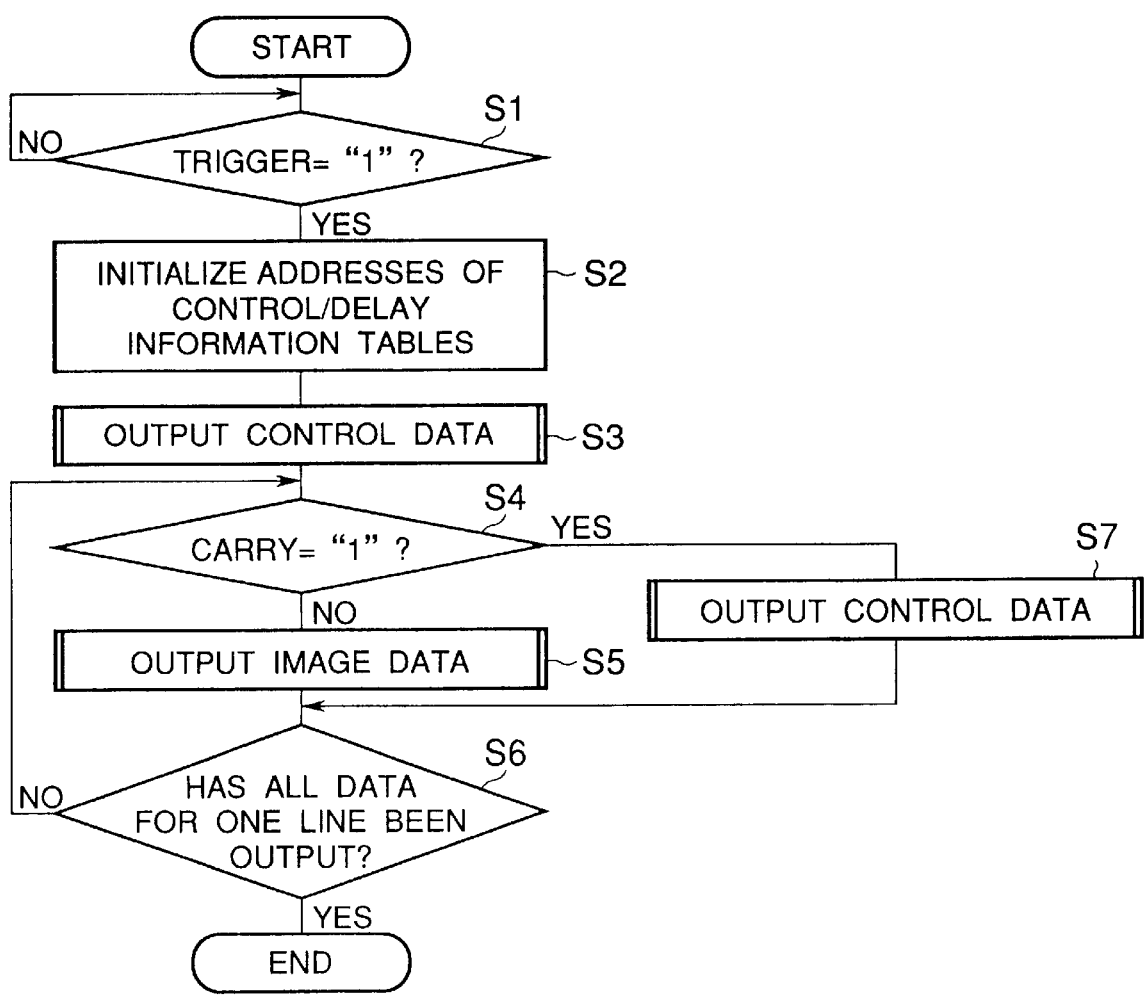
FIG. 30 is a flowchart illustrating the operation of the LED head controller shown in FIG. 29.

FIG. 30 is a flowchart illustrating the operation of the LED head controller shown in FIG. 29.

At step S1 a check is made to determine whether the trigger is "1." If the answer is YES at step S1, the program proceeds to step S2 where the addresses of the control information table 44 and time information table 43 are initialized. The control data is output at step S3 and a check is made at step S4 to determine whether the CARRY output of the counter 45 is "1"; if the answer is NO, then the program proceeds to step S5 where the image data DD is output, and if the answer is YES, then the program proceeds to step S7 where the control data DS and DL are output. In other words, the image data DD is output alternately with the control data DS and DL at predetermined periods. At step S6, a check is made to determine whether all the data for one line has been output; if the answer is NO, then the program jumps back to step S4.

Figure 31:
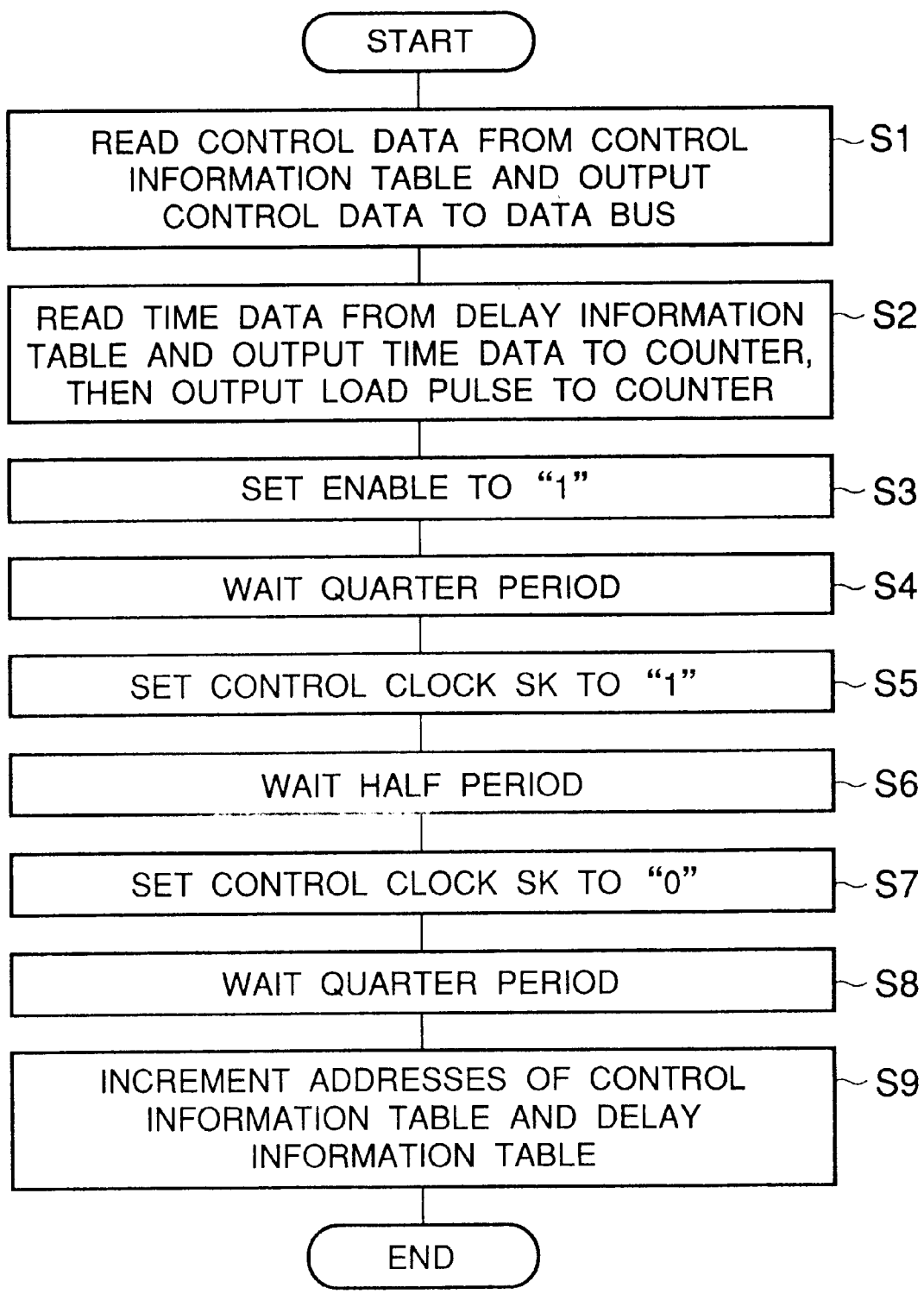
FIG. 31 is a flowchart illustrating the procedure for the LED head controller to output the control information.

FIG. 31 is a flowchart illustrating the procedure for the LED head controller to output the control data.

At step S1, the image data transfer section 42 reads the control data (strobe 1, strobe 2, . . . etc.) from the control information table 44 and outputs the control data to the data bus 16. The contents of the control information table 44 and time information table 43 are exactly the same as those of the first, second, and fourth embodiments. At step S2, the image data transfer section 42 reads the time data from the time information table 43, outputs the time data to the data input terminal of the counter 45, and subsequently outputs a LOAD PULSE to the LOAD terminal to load the time data.

Then, the ENABLE signal of the counter is set to "1" at step S3 and is allowed to remain "1" for a quarter period at step S4. The control clock SK is set "1" at step S5 and is allowed to remain for a half period at step S6. The control clock SK is set to "0" at step S7 and is allowed to remain "0" for a quarter period at step S8. As mentioned above, performing steps S1–S8 generates the control clock SK. The addresses of the control information table 44 and delay time table 43 are incremented at step S9 for the next control data.

Figure 32:
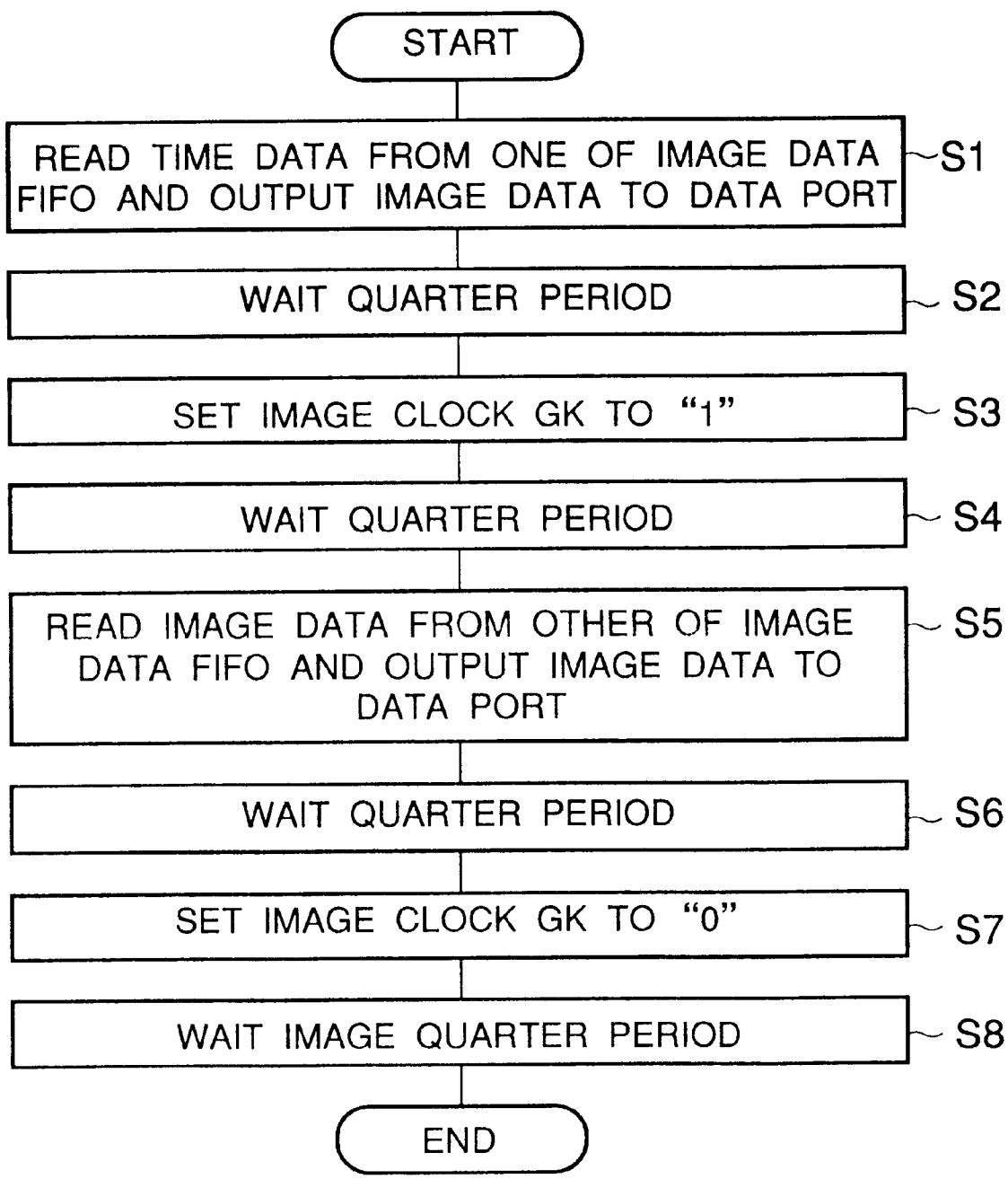
FIG. 32 is a flowchart illustrating the detailed operation of the procedure for outputting the image information.

FIG. 32 is a flowchart illustrating the detailed operation of the procedure for outputting the image data DD. At step S1, the image data transfer section 42 reads the image data DD from one of the two image FIFOs 41A and 41B and outputs the image data DD to the data port. The program waits a quarter period at step S2 and the image clock GK is set to "1" at step S3. Then, the image clock GK is allowed to remain "1" for a quarter period at step S4. The image data transfer section 42 reads image data DD from other of the two image FIFOs 41A and 41B and outputs the image data DD to the data port. The program waits another quarter period at step S6 and the image clock GK is set to "0" at step S7. Thereafter, the image clock GK is allowed to remain "0" for a quarter period at a step S8 before completing the procedure. The image data DD is transferred in timed relation with the image clock GK.

Figure 33:
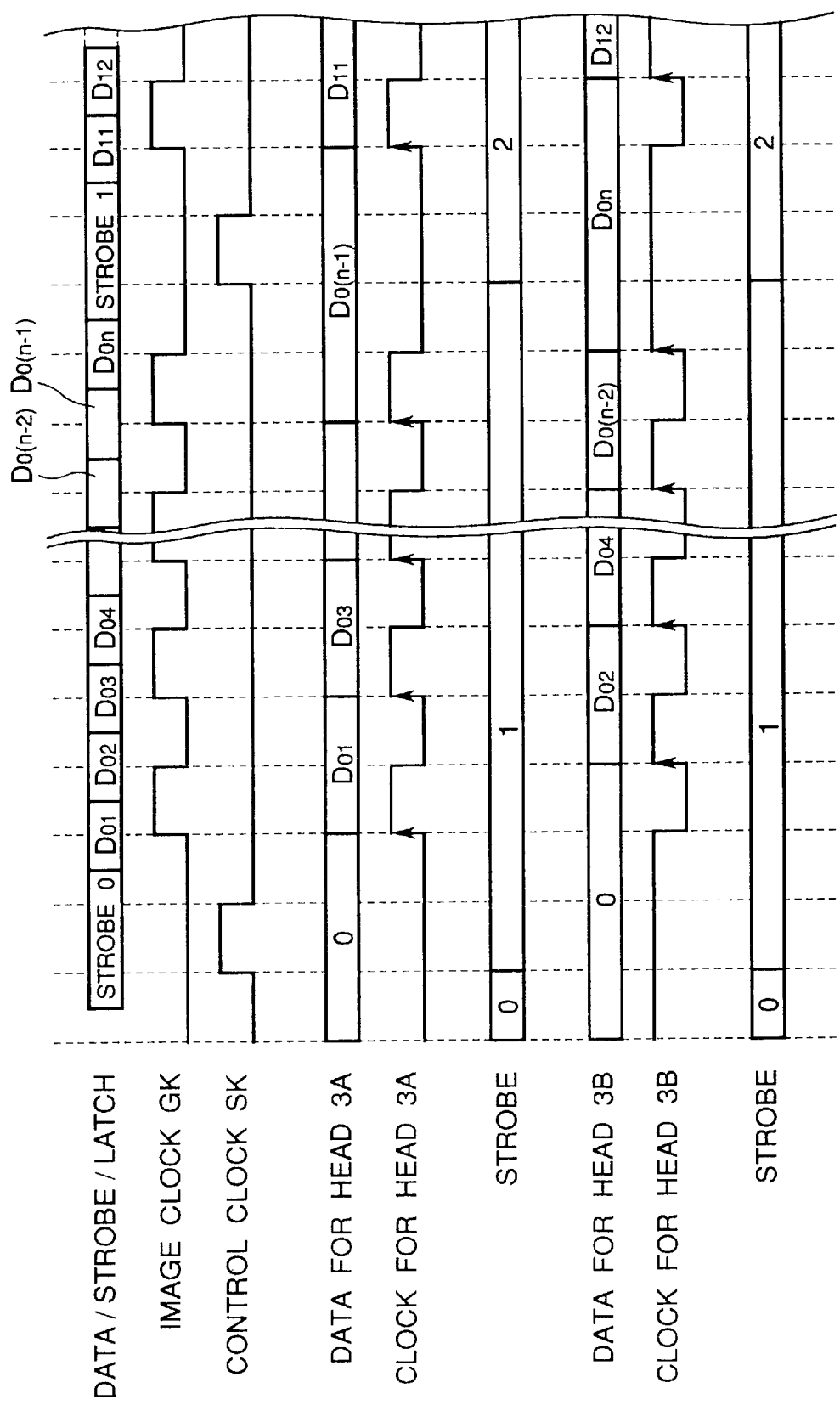
FIG. 33 illustrates the relation among the outputs of, for example, the LED head controller 12A when the LED head controller 12A shown in FIG. 28 transfers data to the LED heads 3A and 3B.

FIG. 33 illustrates the relation among the outputs of, for example, the LED head controller 12A when the LED head controller 12A shown in FIG. 28 transfers the image data DD to the LED heads 3A and 3B.

Strobe 1, $D_{01}$–$D_{08}$, Strobe 2, and $D_{11}$–$D_{12}$ are all items of signals which are output to data bus 16. Strobes and image data DD are both 4-bit values just as in the first embodiment. As is clear from FIG. 33, the image clock GK is directly used as the clock signal DK for driving the LED head 3A. The LED head 3A reads the image data $D_{01}$, $D_{03}$, . . . , $D_{0(n-1)}$, $D_{11}$, . . . on the rising edges of the clock GK. In other words, the LED head 3A reads every other item of the data $D_{01-D0(n-1)}$ and $D_{11}$, $D_{12}$, . . .

The control clock SK triggers the strobe to change in the order of strobe 1, strobe 2, strobe 3, strobe 4, strobe 1, strobe 2, . . . (or 1, 2, 4, 8, 1, 2, . . . if expressed in decimal) on the rising edges of the control clock SK. The state "0" of the strobe implies that the strobe is reset and therefore no LED head is specified. The image clock GK is supplied to the inverter 55 and an inverted output of the inverter 55 is used as the clock for the LED head 3B. The LED head 3B reads the data on the rising edges of the inverted output of the inverter 55. This is equivalent to reading the data on the falling edges of the image clock GK, and therefore the LED head 3B reads $D_{02}$, $D_{04}$, . . . , $D_{0(n-2)}$, $D_{0n}$, and $D_{12}$, . . .

As mentioned above, the data bus 16 transfers the image data DD for LED head 3A alternately with the image data DD for LED head 3B. The strobes are the same for the LED heads 3A and 3B. The LED head controller 12B also transfers corresponding image data DD and strobes for the LED heads 3C and 3D in the same way as the LED head controller 12A.

Figure 34:
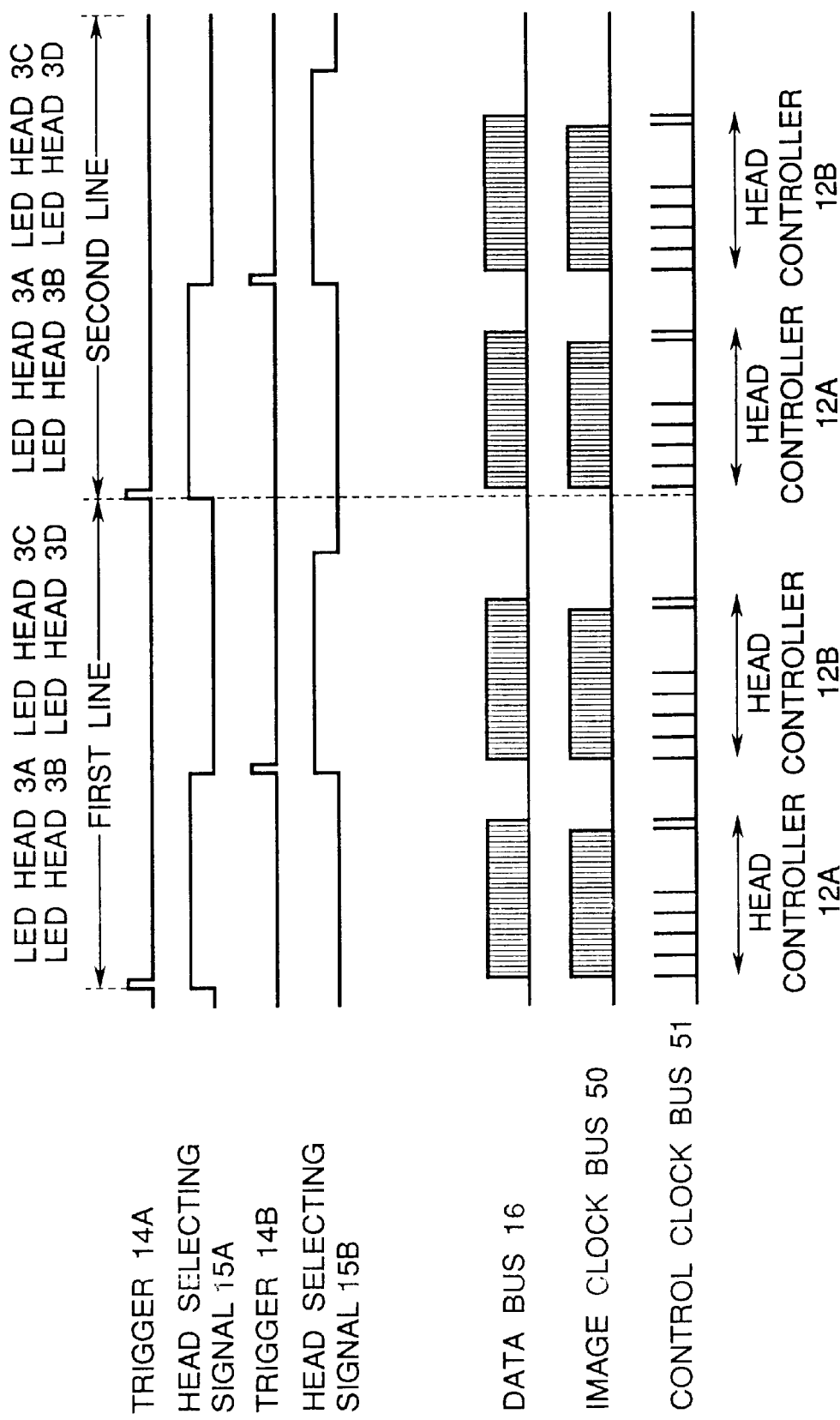
FIG. 34 is a timing chart of signals in the buses.

FIG. 34 is a timing chart of signals in the respective buses.

The image data DD for the LED heads 3A and 3B is transferred to the LED heads 3A and 3B concurrently in multiplexed from at a first half of the period of clock GK or DK required for the first to fourth embodiments, and subsequently the image data DD for the LED heads 3C and 3D is transferred to the LED heads 3C and 3D concurrently in multiplexed form at a second half of the period of clock (GK or DK). The image clock GK and control clock SK appear alternately on the image clock bus 50 and the control clock bus 51, respectively, so that the image data DD and control data on the data bus 16 are alternately directed to their corresponding circuits.

Figure 35:
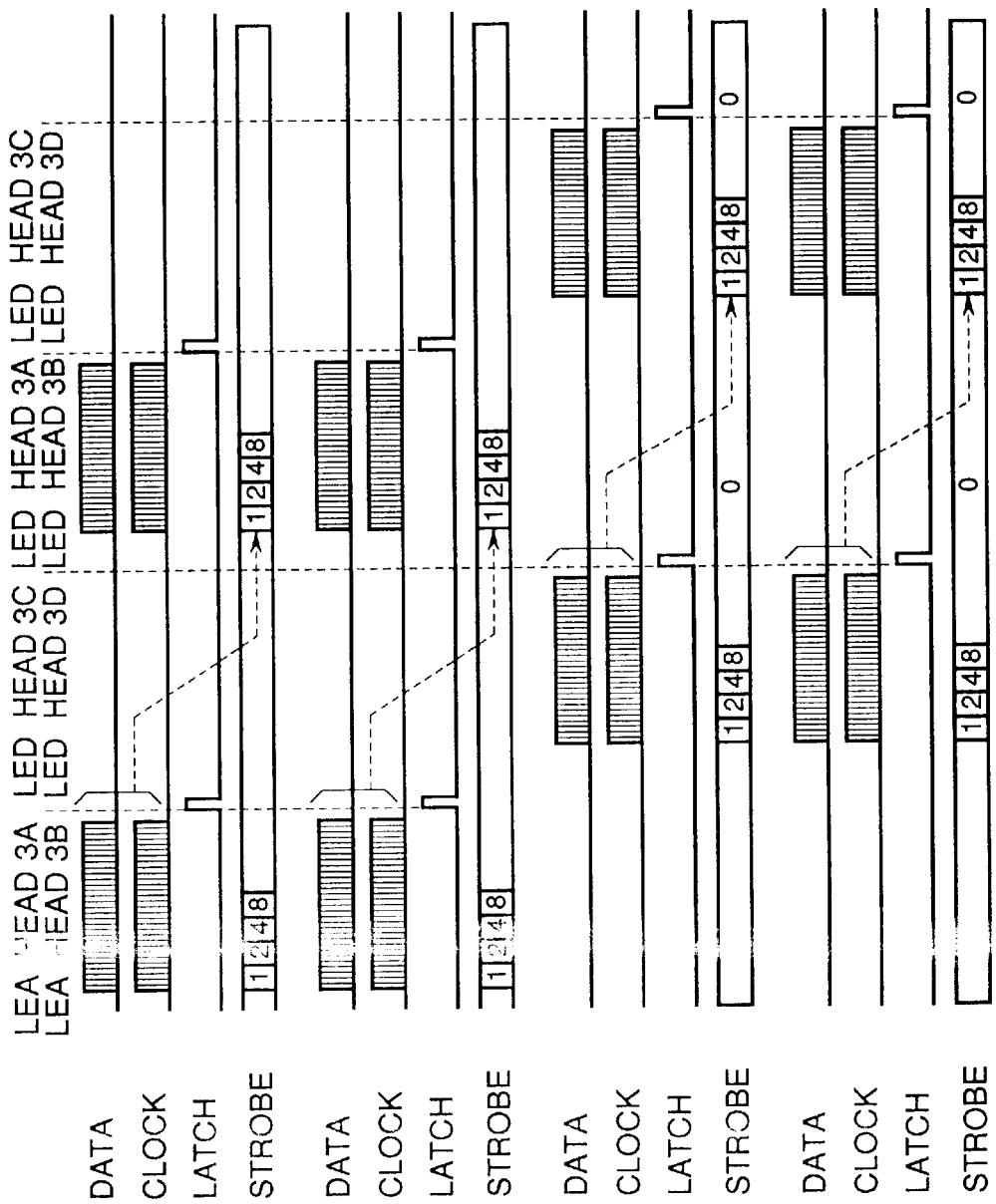
FIG. 35 is a timing chart for the respective LED head.

FIG. 35 is a timing chart for the respective LED heads. The fifth embodiment differs from the first to fourth embodiment in that two LED heads receive corresponding data alternately with each other. It can be assumed that the contents of image data and control data are the same throughout the first, second, and fourth embodiments.

Figure 36:
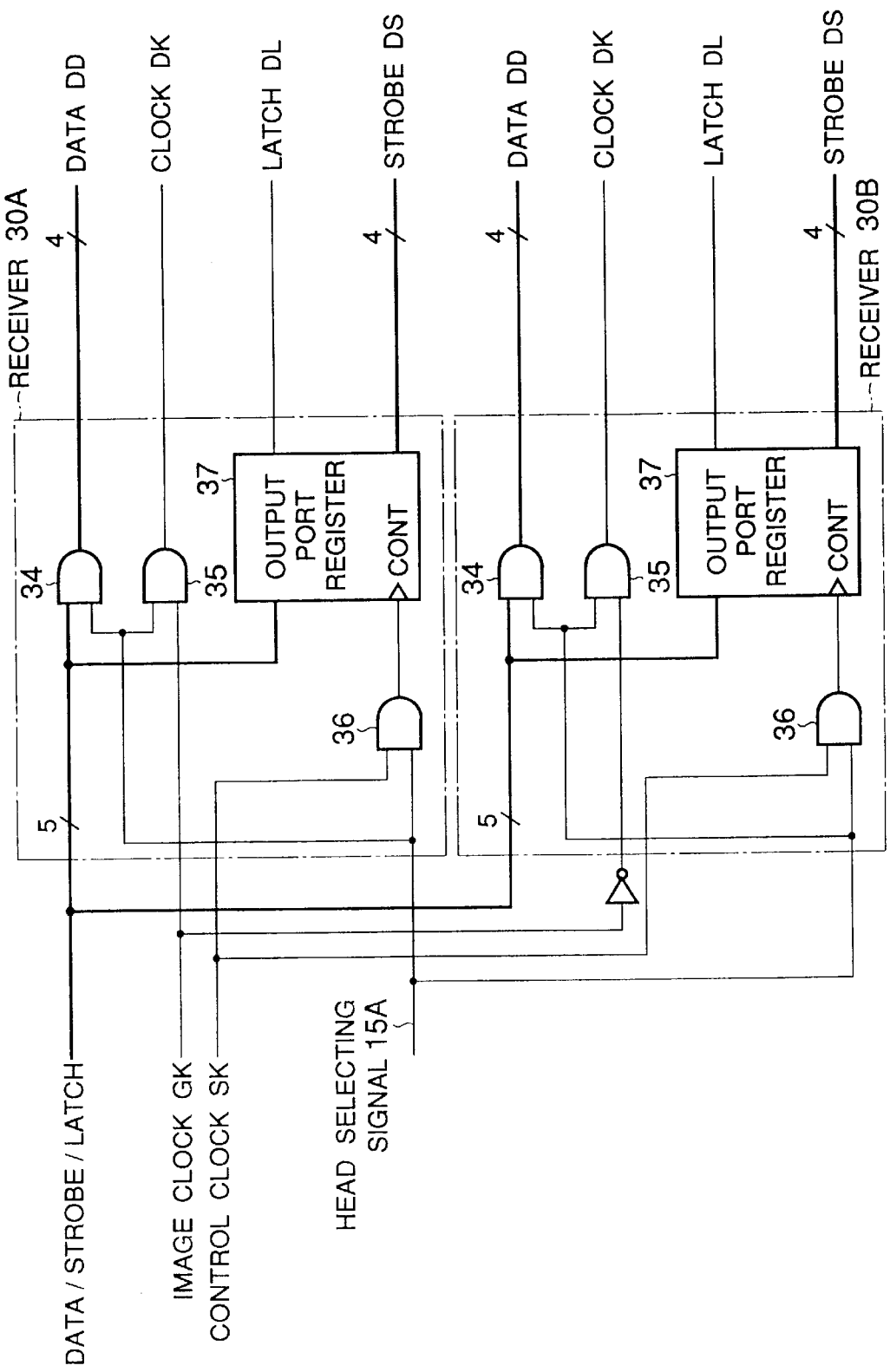
FIG. 36 is a block diagram showing the configuration of the receivers 30A and 30B in FIG. 28.

FIG. 36 is a block diagram showing the configuration of the receivers 30A and 30B in FIG. 28.

Advantages of the Fifth Embodiment

The fifth embodiment is effective in reducing the number of required cables. Two items of data are transferred alternately over the data bus so that each of the two items of data is transferred to a corresponding LED head, and the receivers for the respective heads receive corresponding data at different timings, i.e., rising edges and falling edges of the image clock. This way can transfer the data twice as fast as the conventional conventional data transfer without having to change the timings at which the image data and control data are transferred to a plurality of LED heads, implementing high speed printer at low cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A printer, comprising:
    a plurality of heads;
    a control board having a plurality of head controllers mounted thereon, each one of the plurality head controllers outputting a plurality of items of data to a corresponding one of said plurality of heads, said plurality of items of data including image data and control signals associated with the image data;
    a connection board having a plurality of receivers mounted thereon, each one of the plurality of receivers receiving said plurality of items of data for a corresponding one of said plurality of heads; and
    a set of cables provided between said control board and said connection board, said plurality of items of data being transmitted over said set of cables in time division form from each of said head controllers to a corresponding one of said plurality of receivers.

2. The printer according to claim 1, wherein each of said receivers includes a gate circuit which opens upon receiving a head selecting signal supplied thereto to allow the plurality of items of data to pass.

3. The printer according to claim 1, wherein said control signals include a selector signal and a group of signals;
    and said set of cables include a selector bus over which the selector signal is transferred and a data bus over which the image data and the group of signals are alternately transferred, the selector signal indicating which of the image data and the group of signals is transferred over the data bus; and
    each of said receivers selectively directs the image data and the group of signals into different data paths.

4. The printer according to claim 3, wherein said heads are LED heads for use in an electrophotographic printer, each of said LED heads illuminating a surface of a corresponding photoconductive drum.

5. The printer according to claim 3, wherein each of said receivers are activated upon a corresponding head selecting signal supplied thereto to allow the plurality of items of data to pass.

6. The printer according to claim 3, wherein said control signals include a strobe signal for driving a corresponding one of said heads in accordance with the image data.

7. A printer, comprising
    a plurality of heads;
    a plurality of head controllers, each outputting a plurality of items of data to a corresponding one of said plurality of heads, said plurality of items of data including image data and control signals associated with the image data,
    a set of common buses over which said head controllers transfer in turn said plurality of items of data to corresponding ones of said plurality heads; and
    a plurality of receivers, each being provided to a corresponding one of said plurality of heads and receiving said items of data;
    wherein said control signals include a selector signal and a group of signals;
    said set of common buses includes a selector bus over which the selector signal is transferred and a data bus over which the image data and the group of signals are alternatively transferred, the selector signal indicating which of the image data and the group of signals is transferred over the data bus; and
    each of said receivers selectively directs the image data and the group of signals into different data paths;
    wherein said head controllers encode the group of signals into control codes having a smaller number of bits and said receivers decode the control codes into the group of signals.

8. The printer according to claim 7, wherein each of said receivers is activated upon a corresponding head selecting signal supplied thereto to allow the plurality of items of data to pass.

9. A printer, comprising:
    a plurality of heads;
    a plurality of head controllers, each outputting a plurality of items of data to a corresponding one of said plurality of heads, said plurality of items of data including image data and control signals associated with the image data;
    a set of common buses over which said head controllers transfer in turn said plurality of items of data to corresponding ones of said plurality heads;
    a plurality of receivers, each being provided to a corresponding one of said plurality of heads and receiving said items of data; wherein said control signals include a group of signals, an image clock and a control clock; and
    said set of common buses includes an image clock bus over which the image clock is transferred, a control clock bus over which the control clock is transferred, and a data bus over which the image data and the group of signals are alternately transferred, the group of signals being attended by the control clock and the image data being attended by the image clock;
    and wherein each of said receivers directs the image data into a first data path on the image clock and the group of signals into a second data path on the control clock.

10. The printer according to claim 9, wherein said control signals include a strobe signal for driving a corresponding one of heads in accordance with the image data and a latch for latching the image data into a corresponding one of said heads.

11. The printer according to claim 9, wherein said heads are LED heads for use in an electrophotographic printer, each of said LED heads illuminating a surface of a corresponding photoconductive drum.

12. The printer according to claim 9, wherein each of said receivers are activated upon a corresponding head selecting signal supplied thereto to allow the plurality of items of data to pass.

13. A printer, comprising:
    a plurality of heads;
    a plurality of head controllers, each outputting a plurality of items of data to a corresponding one of said plurality of heads, said plurality of items of data including image data and control signals associated with image data;
    a plurality of receivers, each being provided to a corresponding one of said plurality of heads and receiving said items of data;

a set of common buses over which said head controllers transfer in turn said plurality of items of data to corresponding ones of said plurality of heads;

wherein said image data includes a pulse train of image data in which first image data and second image data appear alternately;

said control signals include a group of signals, an image clock, and a control clock; and said set of common buses includes an image clock bus over which the image clock is transferred, a control clock bus over which the control clock is transferred, and a data bus over which the train of image data and the group of signals are alternately transferred;

wherein said plurality of heads includes a first head and a second head and said plurality of receivers includes a first receiver and a second receiver;

and wherein the first receiver directs the first image data into the first head on one of rising and falling edges of the image clock;

and wherein the second receiver directs the second image data into the second head on the other of the rising and falling edges of the image clock.

14. The printer according to claim 13, wherein said control signals include a strobe signal for driving a corresponding one of heads in accordance with the image data and a latch for latching the image data into a corresponding one of said heads.

15. The printer according to claim 13, wherein said heads are LED heads for use in an electrophotographic printer, each of said LED heads illuminating a surface of a corresponding photoconductive drum.

16. The printer according to claim 13, wherein each of said receivers activated upon a corresponding head selecting signal supplied thereto to allow the plurality of items of data to pass.

* * * * *